United States Patent
Baba et al.

[19]

[11] Patent Number: 6,108,440
[45] Date of Patent: Aug. 22, 2000

[54] IMAGE DATA CONVERTING METHOD

[75] Inventors: Shigeyuki Baba, Tokyo; Akira Shirakura, Kanagawa; Nobuhiro Kihara, Kanagawa; Koji Ashizaki, Kanagawa, all of Japan

[73] Assignee: Sony Corporation, Tokyo, Japan

[21] Appl. No.: 08/876,289

[22] Filed: Jun. 16, 1997

[30] Foreign Application Priority Data

Jun. 28, 1996 [JP] Japan .................................. 8-170018
Jun. 28, 1996 [JP] Japan .................................. 8-170021

[51] Int. Cl.[7] .............................. G06K 9/00; G06K 9/36; G03H 1/08; G03H 1/26
[52] U.S. Cl. ................................ 382/154; 359/9; 359/23; 382/276
[58] Field of Search ..................................... 382/312, 154, 382/276; 359/9, 23, 900, 22, 14, 462, 478

[56] References Cited

U.S. PATENT DOCUMENTS

| | | | |
|---|---|---|---|
| 4,964,684 | 10/1990 | Iovine | 350/3.76 |
| 5,287,437 | 2/1994 | Deering | 395/127 |
| 5,663,815 | 9/1997 | Molteni et al. | 359/9 |
| 5,703,961 | 12/1997 | Rogina et al. | 382/154 |

FOREIGN PATENT DOCUMENTS

| | | | |
|---|---|---|---|
| 3007794 | 9/1980 | Denmark | G03H 1/04 |
| 06204885 | 7/1994 | European Pat. Off. | G06F 15/66 |
| 244912A | 9/1980 | France | G03H 1/30 |
| 2 702 580 | 9/1994 | France | G06F 15/62 |
| WO9407233 | 3/1994 | WIPO | G09F 19/22 |
| WO9602873 | 2/1996 | WIPO | G03H 1/26 |

*Primary Examiner*—Thomas D. Lee
*Assistant Examiner*—Wenpeng Chen
*Attorney, Agent, or Firm*—Ronald P. Kananen; Rader, Fishman & Grauer

[57] ABSTRACT

An image data generating method for generating image data corresponding to a planar holographic stereogram is provided. First, an object or imaging device is rotated, while the distance between the object and the imaging device is kept substantially constant, for shooting plural images of different viewing angles by the imaging device. The image data of plural images is then corrected for keystone distortion. The image data corrected for keystone distortion is then processed with viewing point conversion processing for converting the viewing point for generating image data of images recorded on the holographic stereogram. In addition, image data including the information for plural images is compressed for storage in the internal storage device of the computer. With the image data having been read into the internal storage device, only the image data of an image required for image data conversion processing of generating image data of the image recorded on a holographic stereogram is expanded for executing image data conversion processing operations.

5 Claims, 17 Drawing Sheets

IMAGE DATA CONVERTING METHOD

BACKGROUND OF THE INVENTION

1. Field of the Invention

This invention relates to an image data generating method for generating image data of an image recorded on a holographic stereogram. The invention also relates to a video data converting method for processing image data of plural images inclusive of the parallax information with pre-set video data conversion processing for generating image data of an image recorded on a holographic stereogram.

2. Description of the Related Art

A holographic stereogram is prepared by sequentially imaging an object from different viewing points for producing plural images as original images and by sequentially recording the images as elementary hologram (hologram elements) in the form of dots or strips.

For producing a holographic stereogram having the parallax information only in the horizontal direction, an object 100 is sequentially imaged from different viewing points in the horizontal direction for producing plural images 101 having the parallax information in the horizontal direction, as shown in FIG. 1. After forming these images into image data, the latter is processed by a computer by pre-set image data conversion processing for generating image data of an image 102 to be recorded on the holographic stereogram. Each image 102 derived from the image data processed with image data conversion processing is sequentially recorded on end in the horizontal direction as a strip-like element hologram on a recording medium for hologram 103. This produces a holographic stereogram having the parallax information in the horizontal direction.

With this holographic stereogram, the information of plural images obtained on sequentially imaging an object from plural different viewing points is sequentially recorded in succession in the horizontal direction as a hologram of plural strip-like elements, so that, if a viewer views the holographic stereogram with both his or her eyes, the two-dimensional images as viewed by the left and right eyes of the viewer are slightly different from each other. Thus the user feels parallax so that a three-dimensional image is reproduced.

Meanwhile, if is desired for a reproduced image of a holographic stereogram to be viewed by the viewer as a spontaneous three-dimensional image, it is necessary to lay in store an extremely large number of images from which the holographic stereogram is derived.

Specifically, even with a holographic stereogram having the parallax information only in the horizontal direction, at least hundreds of original images are required, depending on the size or resolution of the holographic stereogram, for generating a sole holographic stereogram.

Thus, since the holographic stereogram handles voluminous image data, the conventional holographic stereogram formulating system stores image data of original images in a large-capacity external storage device, such as a hard disc drive, and pre-set image data conversion processing is performed on the image data for generating the image data of images recorded on the holographic stereogram.

Meanwhile, for producing the string of parallax images, as original images of the holographic stereogram, an imaging device 111, directed to an object 110, is moved by translational movement as indicated by arrow B1 in FIG. 2, while the imaging device 111 is maintained in the same orientation, and an object 110 is imaged a large number of times from this position. That is, the imaging device 111, directed to the object 110, is moved by transnational movement from a position in which the object 110 enters an imaging range by the imaging device 111 to a position in which the object 110 exits the imaging range by the imaging device 111. During this time, a large number of images are shot.

However, if, with the imaging method, the object 110 is large in size, the imaging device 110 needs to be moved a long distance for imaging the object in its entirety, with the result that the system for producing the string of parallax images is increased in size.

In the above imaging operation, an image angle θv of the imaging device 111, which is reflected in the angle of visibility in the horizontal direction of the holographic stereogram, needs to be set to a sufficiently large value. However, for setting the image angle θv of the imaging device 111 to a large value, a wide angle lens needs to be used, thus raising the cost of the imaging device 111. Moreover, if the image is shot using a wide angle lens with the image angle θv of the imaging device 111 set to a large value, the image tends to be distorted, thus tending to deteriorate the image quality of the holographic stereogram.

In addition, if the string of the parallax images is imaged as described above, many unneeded portions devoid of an image of the object 110 are contained in the string of the parallax images. In particular, the images towards the leading end and the trailing end of the string of the parallax images contain image portions only towards the edge portions thereof, with the main portions thereof being unneeded portions devoid of the image of the object 110. Thus, if image data is produced from the string of parallax images, a large number of unneeded image data are contained, thus counteracting effective data utilization.

Alternatively, the string of parallax images, as original images of the holographic stereogram, may also be obtained by setting the object 110 on a turntable 112, with the imaging device 110 being fixed, and by rotating the turntable 112 a pre-set angle each time the object 110 is imaged, as indicated by arrow B2 in FIG. 3, for shooting plural images with different viewing angles.

As compared to the method of moving the imaging device 111 by translational movement, as shown in FIG. 2, the above-described imaging method has an advantage that the overall size of the imaging system for the string of parallax images can be reduced even if the object 110 has an increased size. Also, a sufficient angle of visibility in the horizontal direction can be assured by rotating the object 110 even if the image angle θv is small. Moreover, since the object 110 is positioned at all times on the front side of the imaging device 111 even if the turntable 112 is rotated, the parallax images of the string are substantially free of unneeded portions devoid of images of the object 110. Thus, if the image data is generated from this string of parallax images, unneeded image data are scarcely contained, thus meritoriously assuring effective data utilization.

Since the conventional holographic stereogram is prepared from viewing points at the shooting time, the holographic stereogram produced on the basis of the string of parallax images obtained on rotating the object 110 as described above is arcuately shaped in meeting with the viewing points at the shooting time. As a matter of course, the holographic stereogram is desirably planar in shape in consideration that the holographic stereogram producing system is used as a printer for outputting a hard copy capable of generating a three-dimensional image.

On the other hand, in formulating a holographic stereogram, since voluminous image data needs to be processed with an image data converting operation and subsequently a large number of images needs to be recorded sequentially as hologram elements, it takes considerable time to produce a holographic stereogram.

However, if it is envisaged to implement the holographic stereogram producing system as a printer device for outputting a hard copy capable of producing a three-dimensional image, it is desirable to reduce the time which elapses since inputting of images as original images of the holographic stereogram until completion of the holographic stereogram.

For example, the image data conversion processing of generating image data of images recorded on the holographic stereogram from image data of the original images is extremely time-consuming, and hence it is desired to speed up the image data conversion processing operations.

In particular, in image data conversion processing, the data processing volume is increased with improved quality of the three-dimensional image to be recorded on the holographic stereogram. That is, if it is attempted to raise the resolution, image data is increased in quantity, thus increasing the processing time involved in image data conversion. On the other hand, if color correction is envisaged for improving color reproducibility, the processing time involved in image data conversion processing is increased. The result is that the processing speed in the image data conversion processing needs to be raised as the higher image quality is aimed at.

SUMMARY OF THE INVENTION

It is therefore an object of the present invention to provide an image data generating method for generating image data in meeting with a planar holographic stereogram whereby the parallax image string imaging system for generating a parallax image string can be reduced in size and the image angle of the imaging device need not be set to a larger value, while unneeded image data may be reduced and data may be utilized effectively.

It is another object of the present invention to provide an image data conversion method whereby image data of images recorded on a holographic stereogram can be generated speedily from plural images from which has originated the holographic stereogram.

For accomplishing the above-mentioned first object, the present invention provides a image data generating method including rotating an object or an imaging device, with the distance between the object and the imaging device being kept substantially constant, for shooting plural images of different viewing points by the imaging device, correcting image data of a plurality of images as shot for keystone distortion and processing the image data corrected for keystone distortion with viewing point conversion processing for generating image data of an image for recording on a holographic stereogram.

When imaging an object, the object is placed on a rotary table, which is then rotated a pre-set angle each time the object is imaged for producing plural images with different viewing points. Also, when imaging an object, the imaging device is rotated a pre-set angle each time the object is imaged for producing plural images with different viewing points.

At the time of viewing point conversion processing, pixels making up an image corrected for keystone distortion are interchanged every pixel string, and image data of an image for recording on a holographic stereogram are recorded on a holographic stereogram so that a reproduced image will be formed in the vicinity of a hologram surface of the holographic stereogram.

For accomplishing the above-mentioned second object, the present invention provides an image data conversion method including compressing image data including the information of plural images and storing the compressed data in an internal memory device of a computer and expanding, after storage of image data in an internal memory device, only image data of an image required for image data conversion of generating image data of an image recorded on a holographic stereogram, for performing the image data conversion processing. The image data conversion processing may be a viewing point conversion processing of converting the position of the viewing point. The JPEG compressing system, for example, may be used as an image data compressing system.

In the first-stated image data generating method, in which the object or the imaging device is rotated for shooting plural images of different viewing points, the parallax image string imaging system for generating the parallax image string may be reduced in size as compared to the method of displacing the imaging device by transnational movement, even if the object is large in size. Moreover, a sufficient angle of visibility in the horizontal direction may be realized by rotating the object or the imaging device even if the image angle of the imaging device is small. If the imaging position is shifted, the object is positioned at all times on the front side of the imaging device, so that unneeded portions devoid of the images of the object are scarcely contained in the parallax images of the parallax image string. Thus, if image data is generated from the parallax image string, there are scarcely any unneeded image data in the generated image data, thus assuring significant merit in view of effective data utilization.

With the first-stated image data generating method, since the image data of plural images as shot are corrected for keystone distortion, the resulting image data is comparable to image data of images obtained on transnational movement of the imaging device. Thus the holographic stereogram formulated on the basis of the image data obtained by the first-stated image data generating method proves to be a planar holographic stereogram.

Heretofore, when performing image data conversion processing of generating image data of the image for recording on a holographic stereogram, the original image data is stored in an external storage device, such as a hard disc drive device, which is accessed during image data processing operations. However, the external storage device is low in processing speed, thus necessitating extremely long time for image data conversion processing.

With the second-stated image data conversion method, since the image data is read into an internal storage device of a computer and image data processing is carried out in this state, image data conversion processing can be carried out far more speedily. However, since the voluminous image data is handled in the holographic stereogram, it is practically impossible to read the original image data directly in the internal memory device. Thus, according to the present invention, image data is compressed and the data thus compressed is stored in the internal storage device. The image data necessary for image data conversion processing is occasionally expanded and processed by image data conversion processing. This enables image data conversion processing on the internal storage device.

According to the present invention, the parallax image string imaging system for obtaining the parallax image string can be reduced in size even if the object is of a large size. Moreover, since there is no necessity of setting the image angle of the imaging device to a large value, and hence no necessity of using a special lens such as a wide-angled lens, the imaging device may be reduced in cost.

According to the present invention, since wasteful image data is reduced in volume, data may be utilized effectively. Thus the holographic stereogram may be improved in image quality than with the conventional system handing the same volume of the image data.

In addition, according to the present invention, since image data of plural images as shot is previously corrected for keystone distortion, a planar holographic stereogram can be produced from image data generated by the image data generating method of the present invention.

Furthermore, with the image data converting method of the present invention, image data of images for recording on the holographic stereogram can be promptly generated from plural images from which the holographic stereogram is derived. Thus, with the present invention, it becomes possible to reduce the time since the entry of the images from which the holographic stereogram is derived until completion of the holographic stereogram.

DESCRIPTION OF THE PREFERRED EMBODIMENTS

Figure 1:
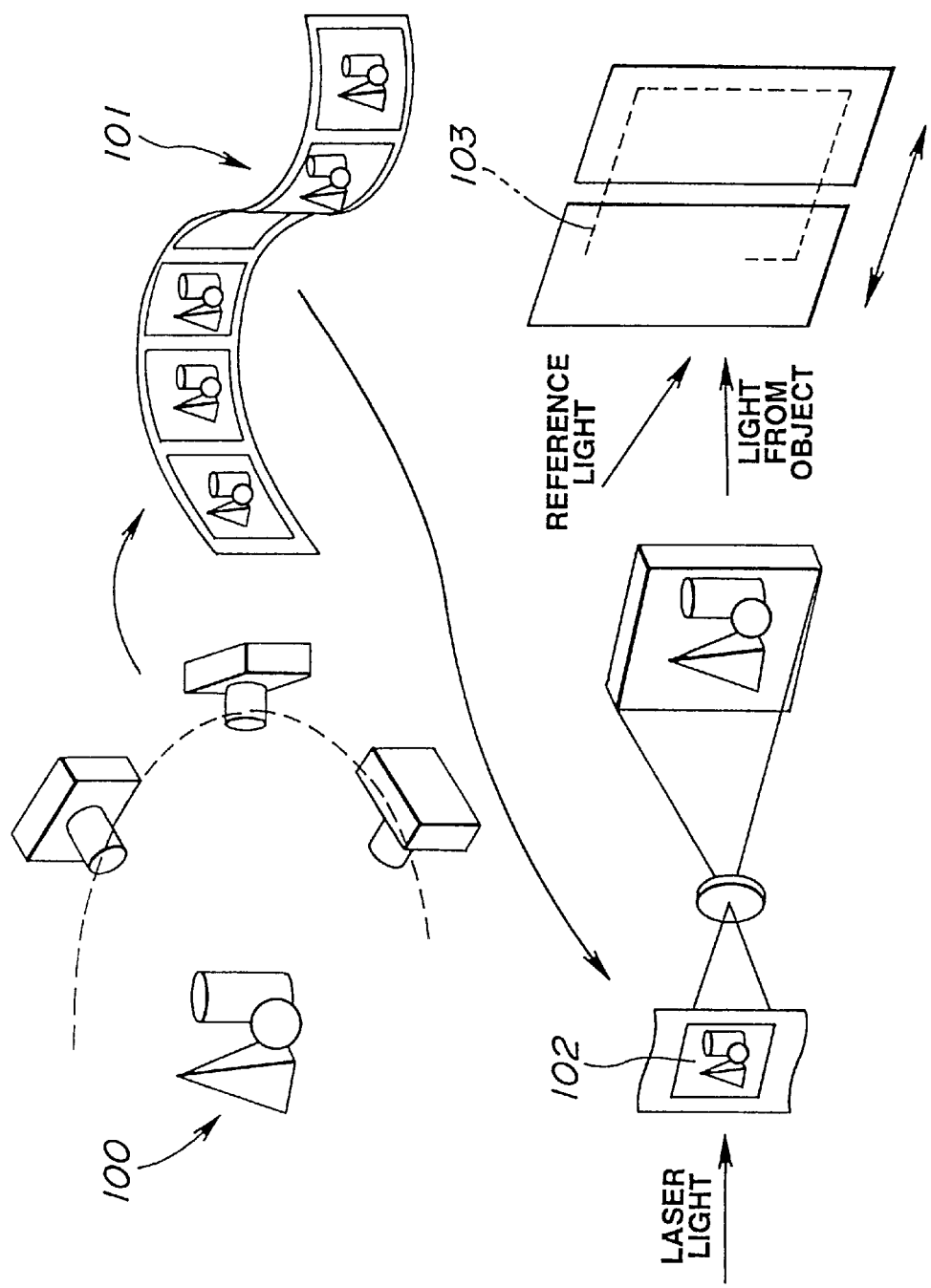
FIG. 1 is a schematic view showing a string of parallax images from which has originated the viewing point conversion processing and a holographic stereogram.
Figure 2:
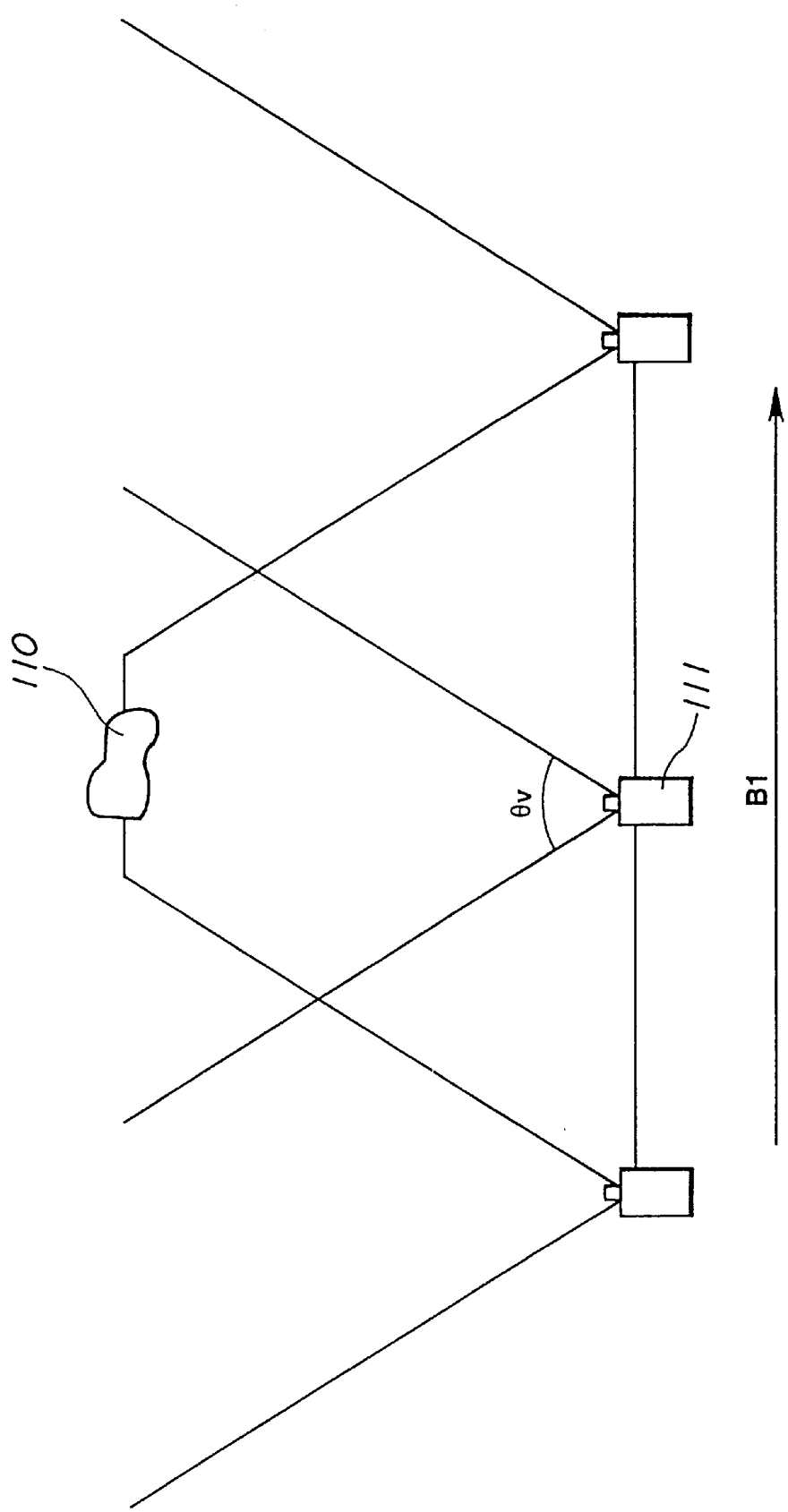
FIG. 2 shows an example of a conventional method for imaging a string of parallax images.
Figure 3:
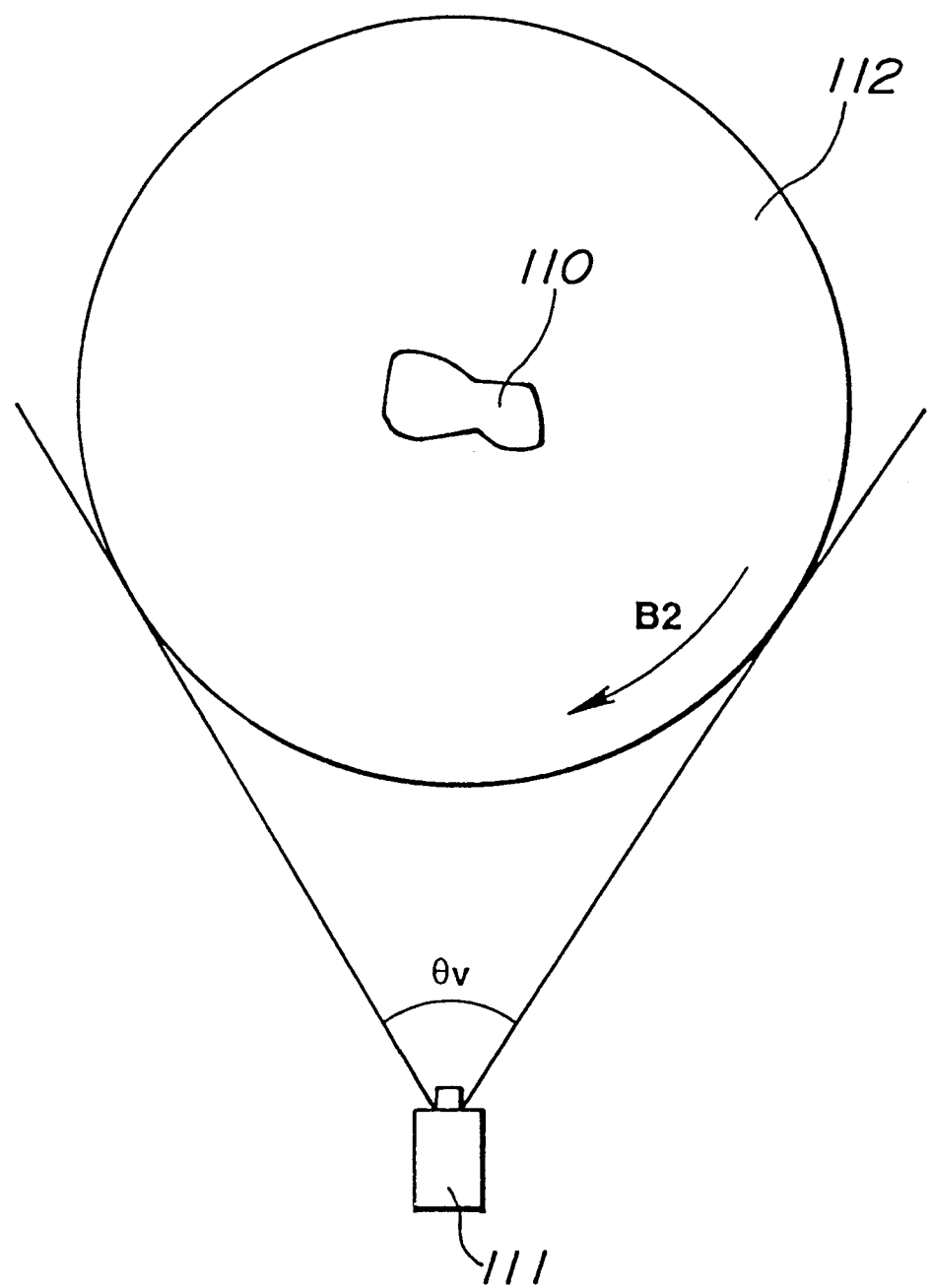
FIG. 3 shows another example of a conventional method for imaging a string of parallax images.

Referring to the drawings, preferred embodiments of the present invention will be explained in detail.

First, an illustrative structure of a holographic stereogram producing system embodying the present invention is explained.

This holographic stereogram producing system is a system for producing a so-called one-step holographic stereogram in which a film-shaped recording medium for hologram, having recorded therein interference fringes of an object light and a reference light, is directly formed into a holographic stereogram.

Figure 4:
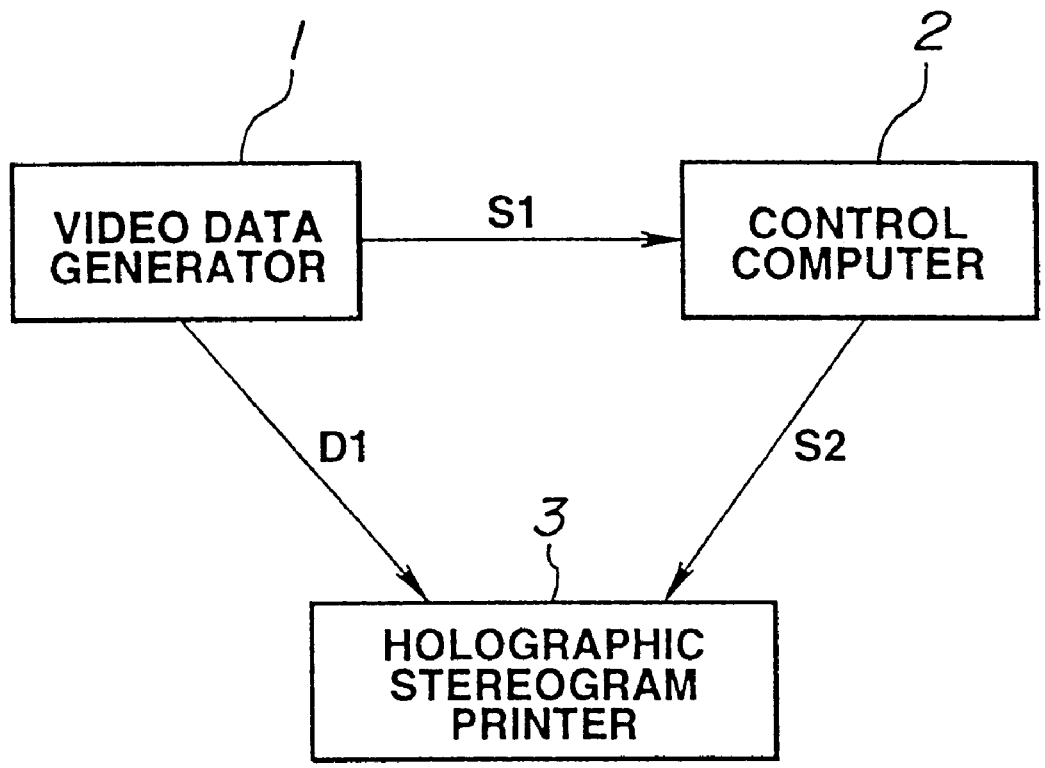
FIG. 4 is a block diagram showing an illustrative structure of a system for generating a holographic stereogram.

Referring to FIG. 4, the holographic stereogram producing system includes an image data generating unit 1 for generating image data of an image recorded on a holographic stereogram, a control computer 2 for controlling the entire system and a holographic stereogram printer device 3 having an optical system for formulating the holographic stereogram.

The image data generating unit 1 generates image data of plural images corresponding to plural hologram elements to be recorded on a holographic stereogram in accordance with the present invention. The generation of image data by the image data generating unit 1 will be explained subsequently in detail.

When recording an image on a recording medium for hologram, the image data generating unit 1 sends generated image data D1 image by image to the holographic stereogram printer device 3 in the order of recording the data D1 on the recording medium for hologram. Also, each time the image data D1 is sent to the holographic stereogram printer device 3, the image data generating unit 1 sends to the control computer 2 a timing signal S1 specifying that the image data D1 has been sent out.

The control computer 2 drives the holographic stereogram printer device 3, based on the timing signal S1 from the image data generating unit 1, for sequentially recording an image generated in the image data generating unit 1, on a recording medium for hologram set in the holographic stereogram printer device 3, as a strip-like elementary hologram (hologram element).

At this time, the control computer 2 controls a shutter and a recording medium feed mechanism provided in the holographic stereogram printer device 3. That is, the control computer 2 sends a control signal S2 to the holographic stereogram printer device 3 to control the shutter opening/closure or the feed of the recording medium for hologram by the recording medium feed mechanism.

Figure 5A:
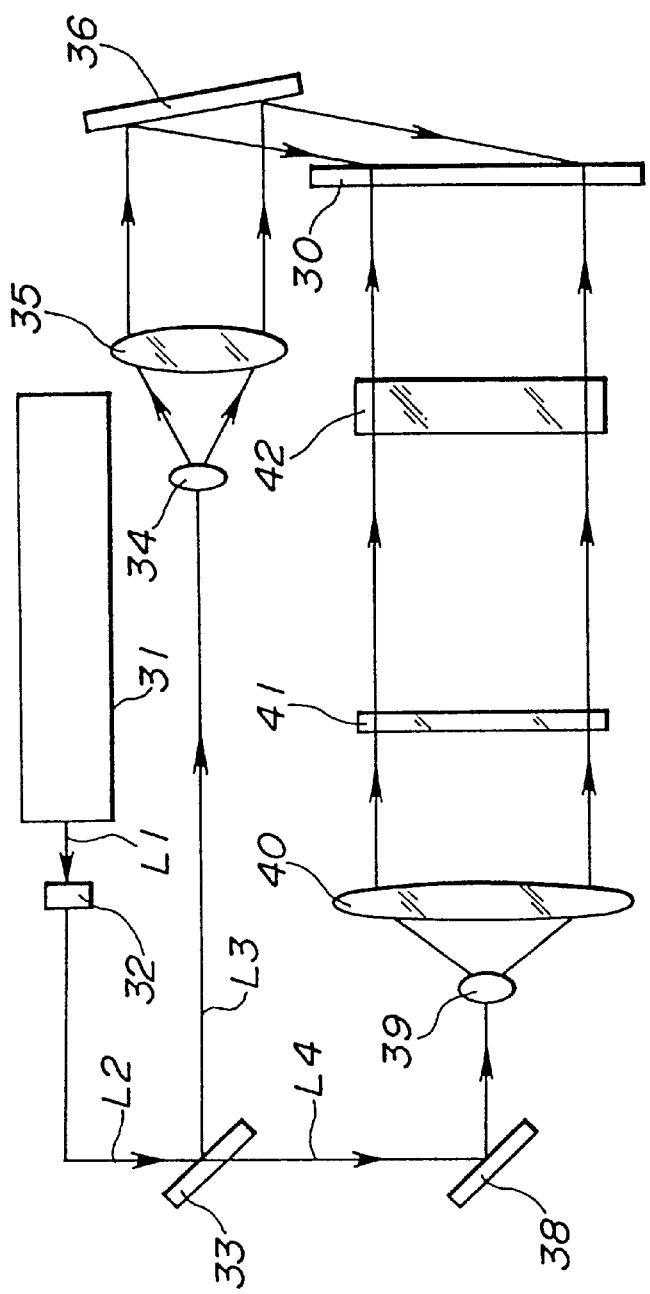
FIGS. 5A, 5B show an illustrative structure of an optical system of a holographic stereogram printing device.
Figure 5B:
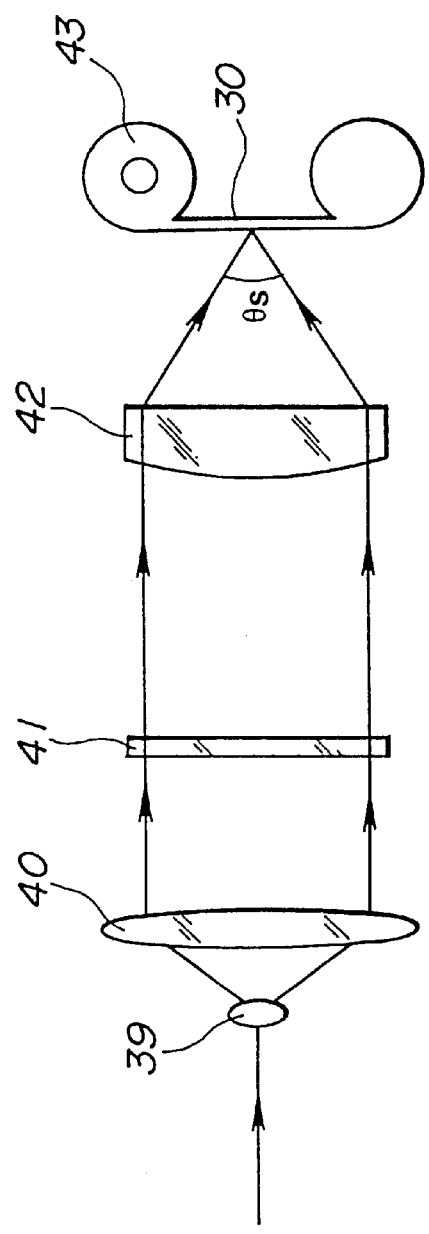

The above holographic stereogram printer device 3 is explained in detail by referring to FIGS. 5A and 5B. FIG. 5A shows an optical system of the holographic stereogram printer device 3 in its entirety from above, while FIG. 5B shows an object light portion of the optical system of the holographic stereogram printer device 3 from lateral side.

Referring to FIGS. 5A and 5B, the holographic stereogram printer device 3 includes a laser light source 31 for radiating the laser light of a pre-set wavelength, a shutter 32 placed on the light path of the laser light beam L1 from the laser light source 31 and a half mirror 33. The shutter 32 is controlled by the control computer 2 and is closed and opened when the recording medium for hologram 30 is not or is exposed to light, respectively. The half mirror 33 is used for separating a laser light beam L2 passed through the shutter 32 into the reference light and the object light, with the light beam L3 reflected by the half mirror 33 and a light beam L4 transmitted through the half mirror 33 proving to be the reference light and the object light, respectively.

On the optical axis of the light beam L3 reflected by the half mirror 33 are arranged, as an optical system for reference light, a cylindrical lens 34, a collimator lens 35 for collimating the reference light and a total reflection mirror 36 for reflecting the collimated light from the collimator lens 35.

The reflected light reflected by the half mirror 33 is diffused by the cylindrical lens 34 so as to be then collimated by the collimator lens 35. The collimated light is subsequently reflected by the total reflection mirror 36 so as to fall on the recording medium for hologram 30.

On the optical axis of a light beam L4 transmitted through the half mirror 33 are arranged, as an optical system for object light, a total reflection mirror 38 reflecting the transmitted light from the half mirror 33, a spatial filter 39 consisting in the combination of an objective lens and a pinhole, a collimator lens 40 for collimating the object light, a display device 41 for displaying an image of an object for recording, and a cylindrical lens 42 for converging the object light on the recording medium for hologram 30.

The light beam L4, transmitted through the half mirror 33, is reflected by the total reflection mirror 38 so as to be diffused by the spatial filter 39 to form a diffused light beam from a point light source. The diffused light beam is then collimated by the collimator lens 40 so as to be then incident on the display device 41. The display device 41 is a transmission type image display device, made up of a liquid crystal panel, and displays an image corresponding to the image data D1 sent from the image data generating unit 1. The light transmitted through the display device 41 is modulated in accordance with the image displayed on the display device 41 so as to fall on the cylindrical lens 42.

The light transmitted through the display device 41 is converged in a horizontal direction by the cylindrical lens 42. The resulting collimated light is then incident on the recording medium for hologram 30 as a strip-shaped object light. That is, in the present holographic stereogram printer device 3, the projected light from the display device 41 is incident on the recording medium for hologram 30 as strip-shaped object light.

The reference light falls on one major surface of the recording medium for hologram 30, while the object light falls on the opposite major surface of the recording medium for hologram 30. That is, the reference light is made to fall at a pre-set angle of incidence on one major surface of the recording medium for hologram 30, while the object light is made to fall on the opposite major surface thereof so that the optical axis thereof falls substantially at right angles to the recording medium for hologram 30. This causes the reference light to interfere with the object light on the recording medium for hologram 30 so that interference fringes generated by the interference are recorded as changes in the refractive index on the recording medium for hologram 30.

The holographic stereogram printer device 3 also includes a recording medium feed mechanism 43 for intermittently feeding a recording medium for hologram 30 under control by a control computer 2. Each time an image corresponding to image data D1 generated by the image data generator 1 is recorded as an hologram element on the recording medium for hologram 30 set on the recording medium feed mechanism 43 in a pre-set state, the recording medium feed mechanism 43 feeds the recording medium for hologram intermittently by one hologram element. This sequentially records an image corresponding to the image data D1 generated by the image data generator 1 as hologram element on the recording medium for hologram 30 so as to be contiguous in the transverse direction.

In the holographic stereogram printer device 3, it is desirable that the length of the optical path of the reference light reflected by the half mirror 33 and incident on the recording medium for hologram 30 be substantially equal to that of the object light transmitted through the half mirror 33 and incident on the recording medium for hologram 30 via the display device 41. This improves interference between the reference light and the object light and hence the image quality of the holographic stereogram.

In the holographic stereogram printer device 3, a diffusion plate may be provided on the light path of the object light for improving the image quality of the holographic stereogram. By providing such diffusion plate, the noise contained in the object light is scattered to assure uniform light intensity distribution of the object light incident on the recording medium for hologram 30 for improving the image quality of the produced holographic stereogram.

However, when arranging the diffusion plate in this manner, a mask having formed therein a strip-shaped opening corresponding to the shape of the elementary hologram is preferably arranged between the diffusion plate and the recording medium for hologram 30. By arranging such mask, a superfluous portion of the object light diffused by the diffusion plate is masked by the mask thus enabling a holographic stereogram of higher image quality to be produced.

For assuring an angle of visibility in the vertical direction for the holographic stereogram in the holographic stereogram printer device 3, a one-dimensional diffusion plate for diffusing the object light in the vertical direction may be provided on the light path of the object light. By arranging this one-dimensional diffusion plate, the object light may be diffused in the vertical direction, that is in the long-axis direction of the produced elementary hologram. Thus the holographic stereogram produced has an angle of visibility in the vertical direction.

However, if the one-dimensional diffusion plate is arranged in this manner, a louver film having a fine lattice in the form of a Japanese reed screen is desirably arrayed between the recording medium for hologram 30 and the one-dimensional diffusion plate. By arranging the louver film in this manner, the reference light transmitted through the recording medium for hologram 30 can be prevented from being reflected by the one-dimensional diffusion plate to re-enter the recording medium for hologram 30.

The operation of the above-described holographic stereogram producing system is now explained.

When producing the holographic stereogram, the image data generating unit 1 sends out image data D1 to the display device 41 of the holographic stereogram printer device 3 in order to display an image for light exposure corresponding to the image data D1 on the display device 41. At this time, the image data generating unit 1 sends out to the control computer 2 a timing signal S1 indicating that the image data D1 has been sent out to the display device 41 of the holographic stereogram printer device 3.

The control computer 2, receiving the timing signal S1, sends out a control signal S2 to the shutter 32 for opening the shutter 32 for a pre-set time duration for exposing the recording medium for hologram 30. Of the laser light L2 which as been radiated from the laser light source 31 and transmitted through the shutter 32, a light beam L3 reflected by the half-mirror 33 falls as a reference light beam on the recording medium for hologram 30 as reference light. A light beam L4, transmitted through the half-mirror 33, proves to be a projection light beam having projected therein the image displayed on the display device 41. The projection light beam falls on the recording medium for hologram 30 as object light. This records the image for light exposure displayed on the display device 41 as strip-like elementary hologram on the recording medium for hologram 30.

When the recording of an image on the recording medium for hologram 30 comes to a close, the control computer 2 sends out the control signal S2 to a recording medium feed mechanism 43 for feeding the recording medium for hologram 30 by one elementary hologram.

The above operation is repeated by sequentially changing the images for light exposure displayed on the display device 41 in the order of the parallax images of the string. This sequentially records the images for light exposure corresponding to the image data generated by the image data generating unit 1 in the form of strip-like elementary holograms on the recording medium for hologram 30.

When sequentially recording the elementary holograms, the recording medium for hologram 30 is slightly oscillated at the time the recording medium for hologram 30 is fed by the recording medium feed mechanism 43. Thus, each time the recording medium for hologram 30 is fed, a standby is provided for the oscillations to subside and the elementary holograms are recorded after subsidence of the oscillations.

With the present holographic stereogram producing system, plural images for light exposure corresponding to the image data generated by the image data generating device 1 are sequentially displayed on the display device 41. The shutter 32 is opened from one image to another so that each image is sequentially recorded as a strip-shaped elementary hologram on the recording medium for hologram 30. Since the recording medium for hologram 30 is fed by one elementary hologram from one image to another, the elementary holograms are arrayed on end in the transverse direction. Thus, plural images inclusive of the parallax information in the transverse direction are recorded as the transversely contiguous elementary holograms on the recording medium for hologram 30 to produce a holographic stereogram having the parallax in the transverse direction.

The image data producing unit 1 of the above-described holographic stereogram producing system is now explained.

The image data producing unit 1 has a parallax image string imaging system for shooting plural images constituting the holographic stereogram, that is a string of parallax images.

Figure 6:
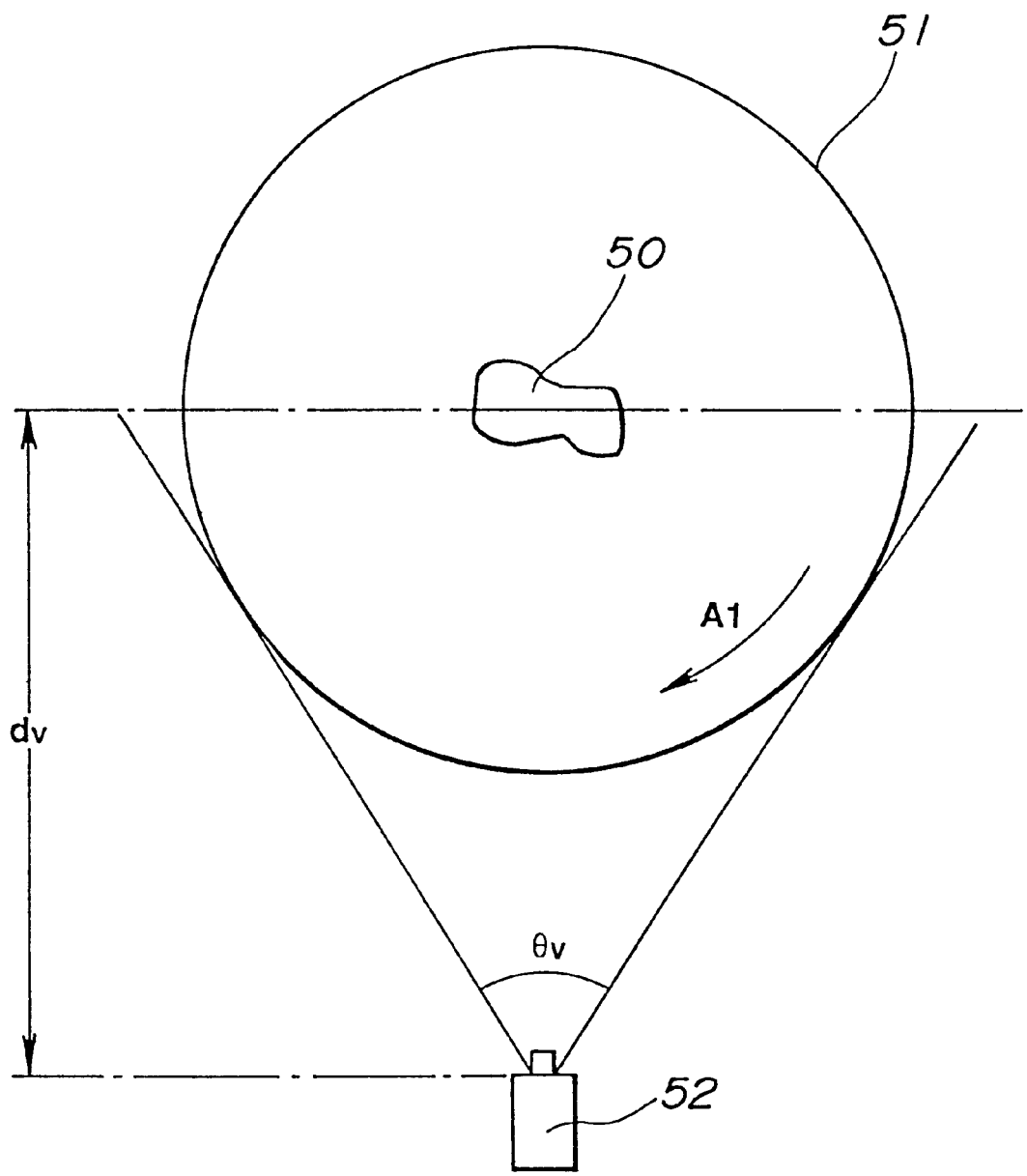
FIG. 6 is a schematic view showing an example of a parallax image string imaging system.

The parallax image string shooting system has a rotary table 51 on which to set an object 50 and a imaging device 52 arranged for being oriented to the center of rotation of the rotary table 51, as shown in FIG. 6. The object 50 set on the rotary table 51 can be rotated, with the imaging device 52 being secured so as to be oriented towards the object 50, with a substantially constant distance dv being kept between the object 50 and the imaging device 52.

For imaging the string of parallax images by the present parallax image string shooting system, the object 50 is set on the rotary table 51. Each time the object 50 is imaged by the imaging device 52, the rotary table 51 is rotated a pre-set angle in the pre-set direction as indicated by arrow Al for shooting plural images with different viewing angles. This produces a string of parallax images having the parallax in the transverse direction.

A similar string of parallax images can be produced by rotating the imaging device 52 about the object 50 as the center of rotation without moving the object, with a substantially constant distance dv being kept between the object 50 and the imaging device 52. In this case, plural images with different viewing angles may be shot by rotating the imaging device 52 a pre-set angle in a pre-set direction as indicated by arrow A2 in FIG. 7, about the object 50 as the center of rotation, with the imaging device 52 being directed to the object 50 with the object 50 being fixed, for shooting plural images having different viewing angles.

Figure 7:
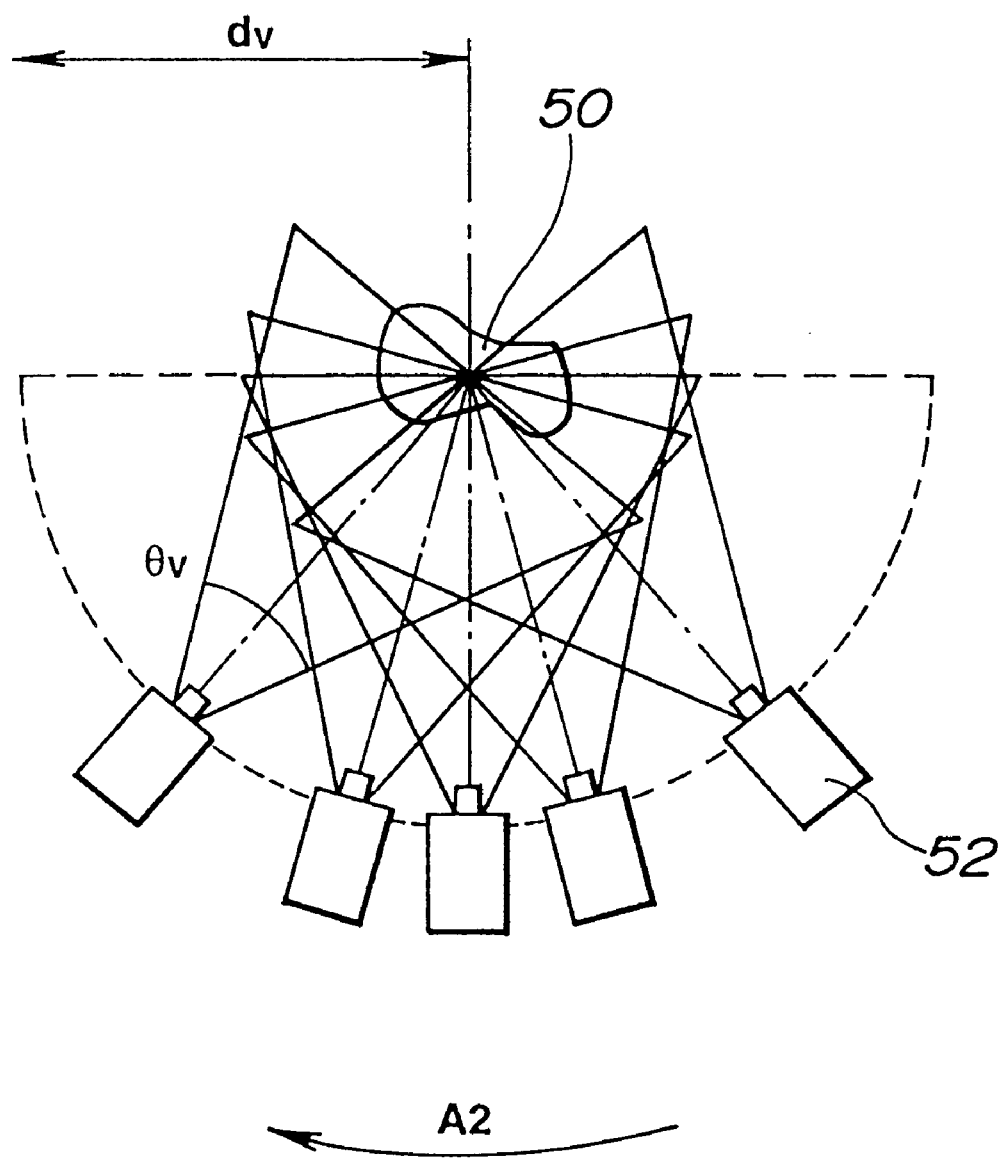
FIG. 7 is a schematic view showing another example of a parallax image string imaging system.
Figure 8:
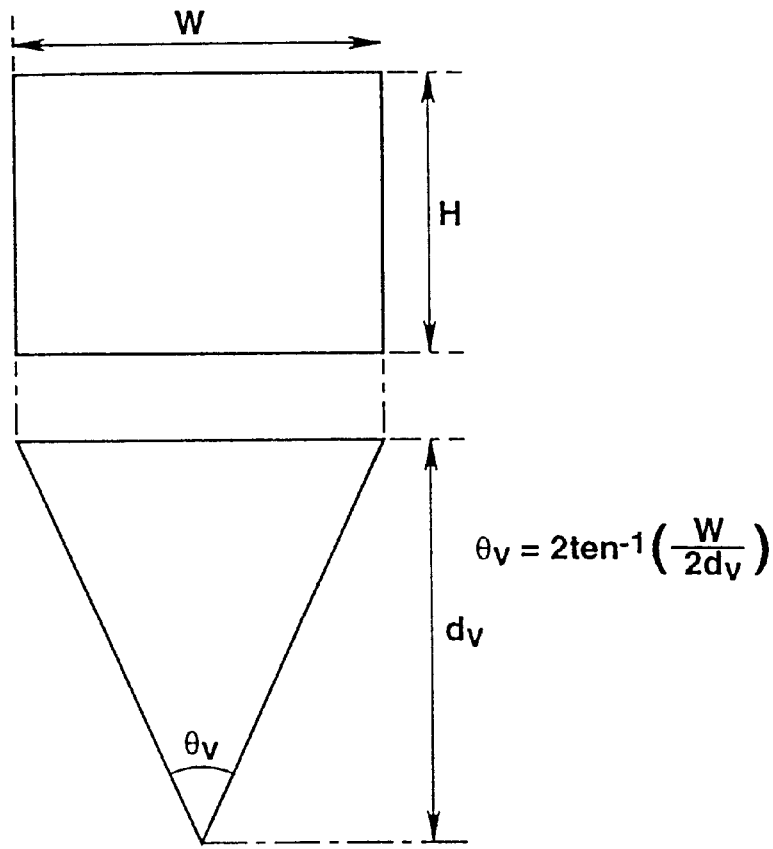
FIG. 8 shows the relation between a holographic stereogram and an image angle of an imaging device.

The method shown in FIG. 6 is equivalent to that shown in FIG. 7, such that the strings of parallax images as imaged by these methods are the same. For actually shooting the string of parallax images, the object 50 or the imaging device 52 is rotated a pre-set angle as described above for continuously changing the viewing points of the object 50 by the imaging device 52 for shooting 500 to 1000 images, as an example.

When rotating the object 50 or the imaging device 52 as described above for imaging the string of parallax images, the image angle θv of the imaging device 52 need not be set to a large value. That is, the image angle θv can be set so that the object 50 will be comprised within the image-shooting range. Thus, with the present parallax image string image-shooting system, there is no necessity of using a wide angle lens for realizing a broad image angle, such that an inexpensive imaging device may be used for image shooting. Moreover, since a narrow image angle θv suffices, the image may be raised in resolution.

Specifically, with the transverse length W and the vertical length H of the holographic stereogram to be produced, and with the distance dv between the holographic stereogram to be produced and the viewing point of the viewer, the image angle θv is set as shown by the following equation (1):

$$\theta v = 2 \tan^{-1}(W/2dv) \quad (1)$$

With the above-described parallax image string producing system, in which the object 50 or the imaging device 52 is rotated for shooting plural images having different viewing angles, the parallax image string producing system in its entirety may be reduced in size, even if the object 50 is large-sized, as compared to the method in which the imaging device 52 is moved by translational movement. In addition, even if the image angle θv of the imaging device 52 is small, a sufficient angle of visibility in the transverse direction may be assured by rotating the object 50 or the imaging device 52. Moreover, even if the image-shooting position is moved, the object 50 is positioned at all times on the front side of the imaging device 52, so that scarcely any wasteful portions devoid of images of the object 50 are contained in the images of the parallax image string, thus assuring effective data utilization.

Meanwhile, the string of parallax images thus shot are read as image data into an image data processing unit configured for processing image data, as later explained. Specifically, in the present embodiment, the string of parallax images is fed to the image data processing unit as video signals of the NTSC system. Thus, as the imaging device 52, such an imaging device is preferred which can output a shot image directly as image data, such as a video camera or a still camera employing a charge-coupled device (CCD) in its photosensitive portion. As the imaging device 52, a camera configured for recording an image on the photosensitive film may also be used. However, it is necessary in this case to convert an image recorded on a photosensitive film into image data using, for example, an image read-out device.

Although the string of parallax images is obtained by actually imaging the object 50 by the parallax image string shooting system, the string of parallax images may also be generated by a computer. That is, plural CAD (computer-aided design) images or plural CG (computer graphics) images may be produced with progressively changing parallax in the transverse direction so as to be used as a string of parallax images.

The above-described image data generating unit 1 includes an image data processor for reading in the string of parallax images from the above parallax image string imaging system for performing pre-set image data processing operations.

Figure 9:
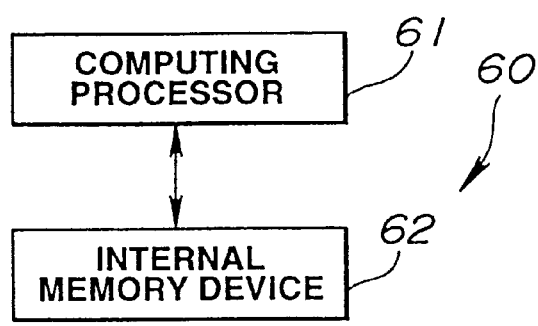
FIG. 9 is a block diagram showing an illustrative structure of an image data processing unit.

Referring to FIG. 9, an image data processor 60 includes an arithmetic processing unit 61 and an internal memory device 62 associated with the arithmetic processing unit 61. The latter includes an input board capable of entering NTSC system video signals at a full-frame rate and a compansion board for companding image data in accordance with the JPEG system. Although the JPEG system is used herein for image compression, other image compression systems may also be used. A set of parallax images may be comprehended as a sort of moving images.

The image compression method may be roughly classified into an intra-frame compression method and an inter-frame compression method. The intra-frame compression method is essentially based on the image compression technique for still images. Examples of the intra-frame compression method include image compression methods employing JPEG, fractal and wavelet transform. The inter-frame compression method is suited to compression of moving images. Examples of the inter-frame compression method include image compression methods employing MPEG1, MPEG2 and CCITT H.261. Since the parallax images exhibit significant inter-frame correlation, it may also be envisaged to take inter-frame differences of the parallax images which are encoded.

The present invention is applicable to all of the above-mentioned still image compression techniques and moving image compression techniques.

Figure 10:
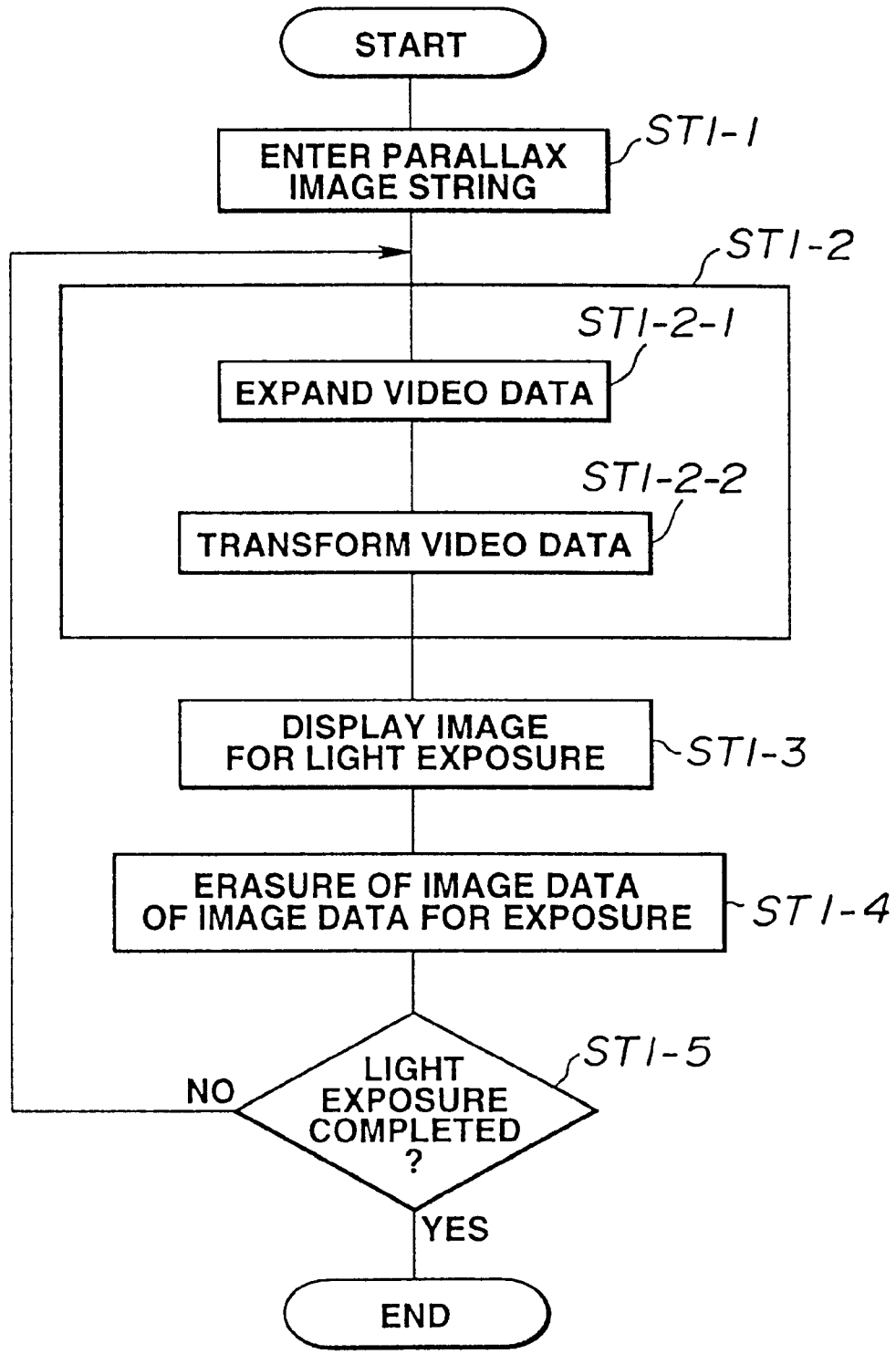
FIG. 10 is a flowchart for image data processing.

The image data processing flow in the image data processor 60 is now explained by referring to the flowchart of FIG. 10.

For image data processing, a string of parallax images is imaged at step ST1-1 by the parallax image string image-shooting system, and image data of the string of parallax images is entered to the video data processor 60. Specifically, each time an image of the object 50 is shot by the imaging device 52 of the parallax image string image-shooting system, video data of the image as shot is sequentially entered from the parallax image string imaging system as video signals of the NTSC system to the arithmetic processing unit 61 of the image data processor 60 via the input board. That is, the image data generating unit 1 of the instant embodiment shoots an image of the object 50 by the imaging device 52 of the parallax image string imaging system and enters video data of the image as shot from the parallax image string imaging system to the image data processor 60.

Each time video data for one image is entered to the arithmetic processing unit 61, the image data thus entered is compressed by a compansion board provided in the arithmetic processing unit 61. The compressed image data is read into the internal memory device 62. Thus, when the shooting of the string of parallax images by the parallax image string imaging system has come to a close, image data corresponding to the compressed data of the parallax image string are read in their entirety in the internal memory device 62. Although the original image data of the string of parallax images are data of an extremely large volume, it becomes possible, by compressing the data and reading in the compressed data, to read voluminous image data of the string of parallax images in the limited space of the internal memory device 62.

In the subsequent image data processing operations, the image data read into the internal memory device 62 and required for image data processing operations are optionally expanded and processed on the internal memory device 62. That is, in the instant embodiment, image data processing is carried out on the internal memory device 62 having extremely fast processing speed. Thus the instant embodiment enables extremely fast image processing operations. Heretofore, original image data are stored in an external storage device, such as a hard disc drive device, which is then accessed for performing image data processing operations. However, since the external storage device, such as the hard disc dove device, is slow in processing speed and hence an extremely long time is consumed in the data processing operations.

With the image data thus read into the internal memory device 62, pre-set image data processing operations are performed at step ST1-2 on the image data read into the internal memory device 62 for generating image data for one image recorded on the holographic stereogram.

At this step ST1-2, image data required for image data processing are first selected at step ST1-2-1 and expanded by the compansion board. Then, at step ST1-2-2, image data conversion processing is performed on the basis of the expanded image data for generating image data for one image recorded on the holographic stereogram.

In the image data conversion processing at this stage, keystone distortion correction processing and viewing point conversion processing are performed, as will be explained subsequently. The viewing point conversion is in need of an extremely large number of times of accessing. Heretofore, image data of the parallax image string are stored in the external storage device and image data processing operations are carried out while access is had to the external storage device. Thus the image data conversion processing hitherto involved an extremely long time. Conversely, with the present embodiment, image data of the parallax image string are compressed and read into the internal storage device 62 for image data conversion therein, thus enabling extremely fast processing operations. The image data processing operations in the internal storage device 62 will be explained in more detail subsequently.

At step ST1-3, the image data D1 generated at step ST1-2-2, that is the image data D1 of the image recorded on the recording medium for hologram 30, is supplied to the display device 41 of the holographic stereogram printer device 3 for displaying the image corresponding to the image data D1 as an image for exposure on the display device 41. The image data generating unit 1 at this time sends out to the control computer 2 a timing signal S1 indicating that an image for light exposure has been displayed on the display device 41.

On reception of the timing signal S1, the control computer 2 causes the shutter 32 of the holographic stereogram printer device 3 to be opened for a pre-set time for exposing the recording medium for hologram 30 to light for recording the image displayed on the display device 41 as elementary hologram on the recording medium for hologram. On completion of the light exposure, the feed mechanism for the recording medium 43 is driven for feeding the recording medium for hologram 30 by one elementary hologram.

That is, the holographic stereogram embodying the present invention sends image data D1 from the image data processor 60 to the display device 41 for displaying an image corresponding to the image data D1 as an image for light exposure on the display device 41, while sending out from the image data processor 60 to the control computer 2 the timing signal S1 indicating that the image for light exposure has been displayed, each time the image for light exposure has been displayed on the display device 41, for synchronizing the timing of image display on the display device 41 with the timing of light exposure of the recording medium for hologram 30. That is, in the present holographic stereogram producing system, the processing on the image is taken care of by the parallax image string image-shooting system and the image data generating unit 1 having the image data processor 60, while the control computer 60 performs only control of the holographic stereogram printer device 3.

At step ST1-4, the image data D1 of the image for light exposure, generated at step ST1-2-2, that is the image data D1 of the image recorded on the recording medium for hologram 30, is erased from the internal memory device 62. This erases image data unneeded in the subsequent processing from the internal memory device 62 for perpetually securing a broad area in the internal memory device 62. If necessary, the image data D1 generated at step ST1-2-2, may be stored in an external memory device, such as a hard disc.

By the above steps, image data of the image for light exposure for one image are generated from the image data of the original parallax image string and an image corresponding to the image data is recorded as elementary hologram on the recording medium for hologram 30.

Then, at step ST1-5, it is checked whether or not the formulation of elementary holograms has been completed in its entirety, that is whether or not light exposure for the recording medium for hologram 30 in its entirety has come to a close. If the light exposure has not come to a close, processing reverts to step ST1-2 for generating image data of the next image recorded on the recording medium for hologram 30. The above sequence of operations is repeated. If light exposure for the recording medium for hologram 30 has entirely come to a close, processing comes to a close.

Meanwhile, in the present embodiment, an elementary hologram is formulated each time the timing signal S1 is sent from the image data processor 60 to the control computer 2. Thus the timing signals S1 are sent out at an interval exceeding the time of subsidence of the oscillations generated due to the feed mechanism for the recording medium 43 feeding the recording medium for hologram 30. This enables the recording medium for hologram 30 to be exposed to light after subsidence of the oscillations of the recording medium for hologram 30, thus improving the image quality of the holographic stereogram produced.

By processing the image data on the internal memory device 62 as described above, it becomes unnecessary to transfer image data with a larger data volume to or from an external memory device, thus significantly improving the processing speed and significantly reducing the time since entry of the parallax image string originating the holographic stereogram until completion of the holographic stereogram.

Moreover, if the image data are processed while the image data are companded on internal memory device 62 as described above, the processing time for image data conversion processing is shortened significantly, such that, if image data is increased further in volume by full-color processing or by raising the resolution, the image data conversion can be achieved within a reasonable time.

Moreover, since some allowance in the processing time is obtained, it becomes possible to incorporate processing other than the viewing point conversion processing as later explained as image data conversion processing. Specifically, image data conversion for color correction in a color hologram or image data conversion processing for lens aberration correction may also be performed as image data conversion processing operations. This further improves the image quality of the holographic stereogram.

In general, if oscillations are generated during formulation of a holographic stereogram, the latter is deteriorated in diffraction efficiency. Therefore, it is crucial to take proper measures against oscillations during formulation of the holographic stereogram. The external memory device, hitherto used for image data conversion processing operations, such as hard disc drive, is accompanied with mechanical oscillations. However, the internal memory device 62 is free from oscillations because the processing operations performed therein are exclusively the electrical processing operations. Therefore, there are produced no oscillations in the instant embodiment as a result of the image data conversion processing operations, thus enabling formulation of a holographic stereogram having excellent diffraction efficiency.

The internal memory device 62, not accompanied by mechanical operations, is far superior in durability as compared to the external memory device, such as a hard disc device. Therefore, system durability is improved by performing image data conversion processing, involving an extremely large number of data accessing operations, in the internal memory device 62.

The image data conversion processing operations performed by the image data processor 60, is explained in detail.

In the instant embodiment, image data of each image as shot by the parallax image string imaging system is corrected for keystone distortion. The image data, thus corrected for the keystone distortion, is processed with viewing point conversion processing of converting the viewing point positions. This generates image data of an image recorded on the recording medium for hologram 30.

The processing for correcting the keystone distortion is now explained.

Figure 11A:
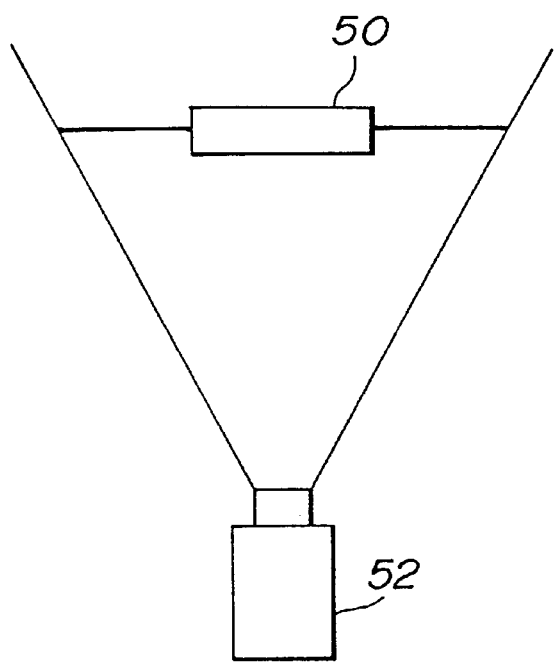
FIGS. 11A, 11B illustrate the manner of shooting and a shot image, with an imaging device being positioned ahead of an object.
Figure 11B:
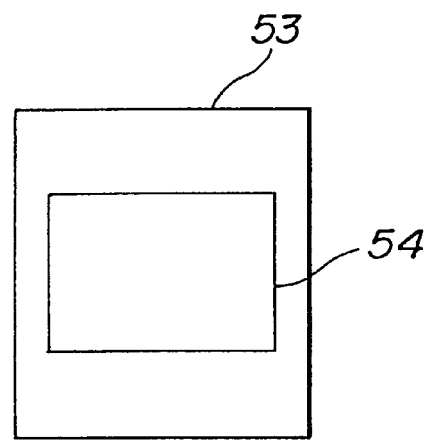
Figure 12A:
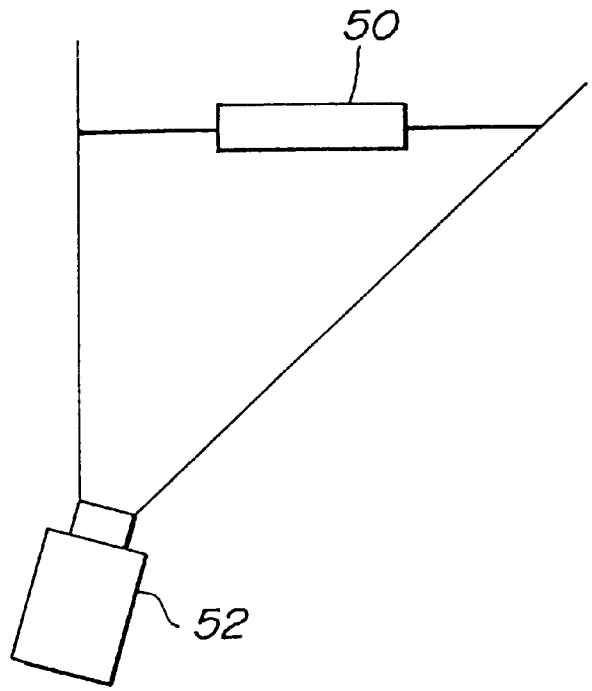
FIGS. 12A, 12B illustrate the manner of shooting and a shot image, with a imaging device not being positioned ahead of an object.
Figure 12B:
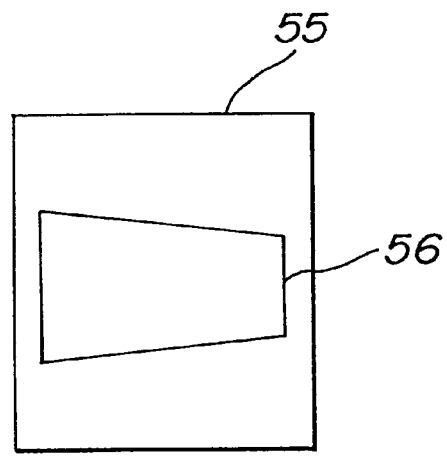
Figure 13:
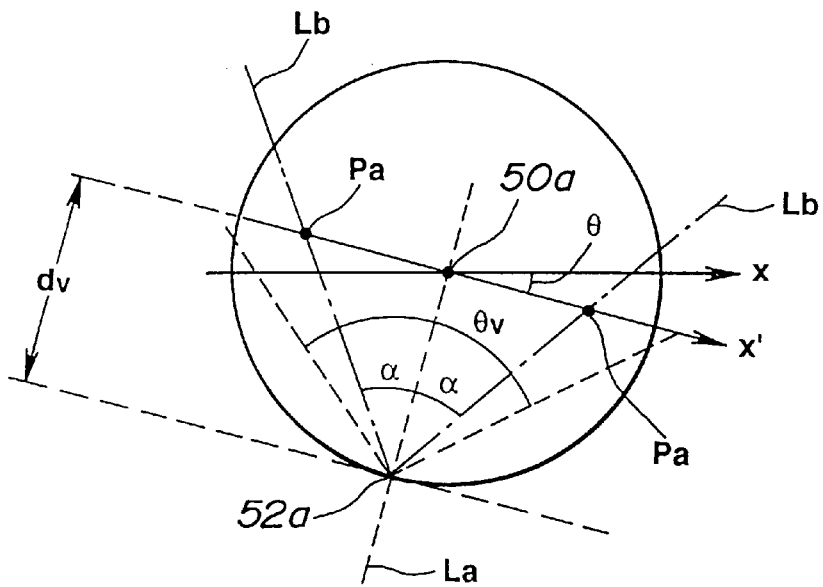
FIG. 13 shows parameters used for correcting the keystone distortion.
Figure 14:
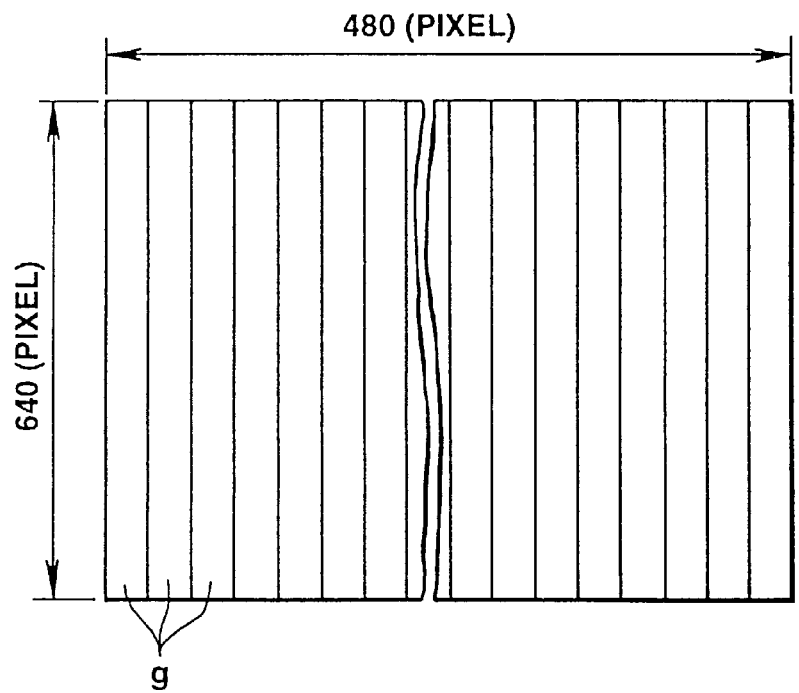
FIG. 14 illustrates an example of a parallax image of a string of parallax images.

In the instant embodiment, the object 50 or the imaging device 52 is rotated for producing a string of parallax images, as described above. Thus, if the imaging device 52 is positioned right in front of the object 50, as shown in FIG. 11A, an object image 54 in the as-shot image 53 is free from distortions, as shown in FIG. 11B. However, if the imaging device 52 is not positioned right in front of the object 50, as shown in FIG. 12A, there is produced the keystone distortion in an object image 56 in an as-shot image 55, as shown in FIG. 12B. The instant embodiment is designed for correcting these keystone distortions.

With a rotational angle $\theta$ of rotation of the object 50 or the imaging device 52 from a reference position in which the imaging device 52 is positioned in front of the object 50, a distance dv between a center of rotation 50a of the object 50 or the imaging device 52 and a viewing point position 52a of the imaging device 52 and an image angle $\theta v$ in the transverse direction of the imaging device 52, with the position of the imaging device 52 in front of the object 50 being a reference position of the imaging device 52, the correction of the keystone distortions may be realized by enlarging or reducing the image from one vertical line of the image to another by a ratio defined by the equation (2):

$$ratio = \frac{\frac{d_v}{\cos\alpha + \sin\alpha \cdot \tan\theta}}{\frac{d_v}{\cos\alpha}} \quad (2)$$
$$= 1/(1 + \tan\alpha * \tan\theta)$$

where $$-\frac{\theta_v}{2} \le \alpha \le \frac{\theta_v}{2}$$

In the above equation (2), if an imaginary line interconnecting the center of rotation 50a of the object 50 and the viewing point position 52a of the imaging device 52 is La and an imaginary line interconnecting an image position Pa to be enlarged or diminished and the viewing point position 52a of the imaging device 52 is Lb, α in the above equation denotes an angle between the imaginary lines La and Lb.

By correcting the keystone distortion for image data of each image, image data of the parallax image string become similar to that obtained on displacing the imaging device by transnational movement. Thus, by correcting these keystone distortions, there is no risk of disturbances in the image due to keystone distortion on formulation of the planar-shaped holographic stereogram.

The processing flow for correcting the keystone distortions is now explained in detail.

Each parallax image of the parallax image string has plural pixels in both the horizontal direction (parallax direction) and the vertical direction (non-parallax direction). Specifically, each image is made up of 480 pixels in the horizontal direction and 640 pixels in the vertical direction. In this case, each image is constituted by 480 pixel strings g arranged side-by-side in the transverse direction, each pixel string being in turn made up of 640 vertically arrayed pixels.

Figure 15:
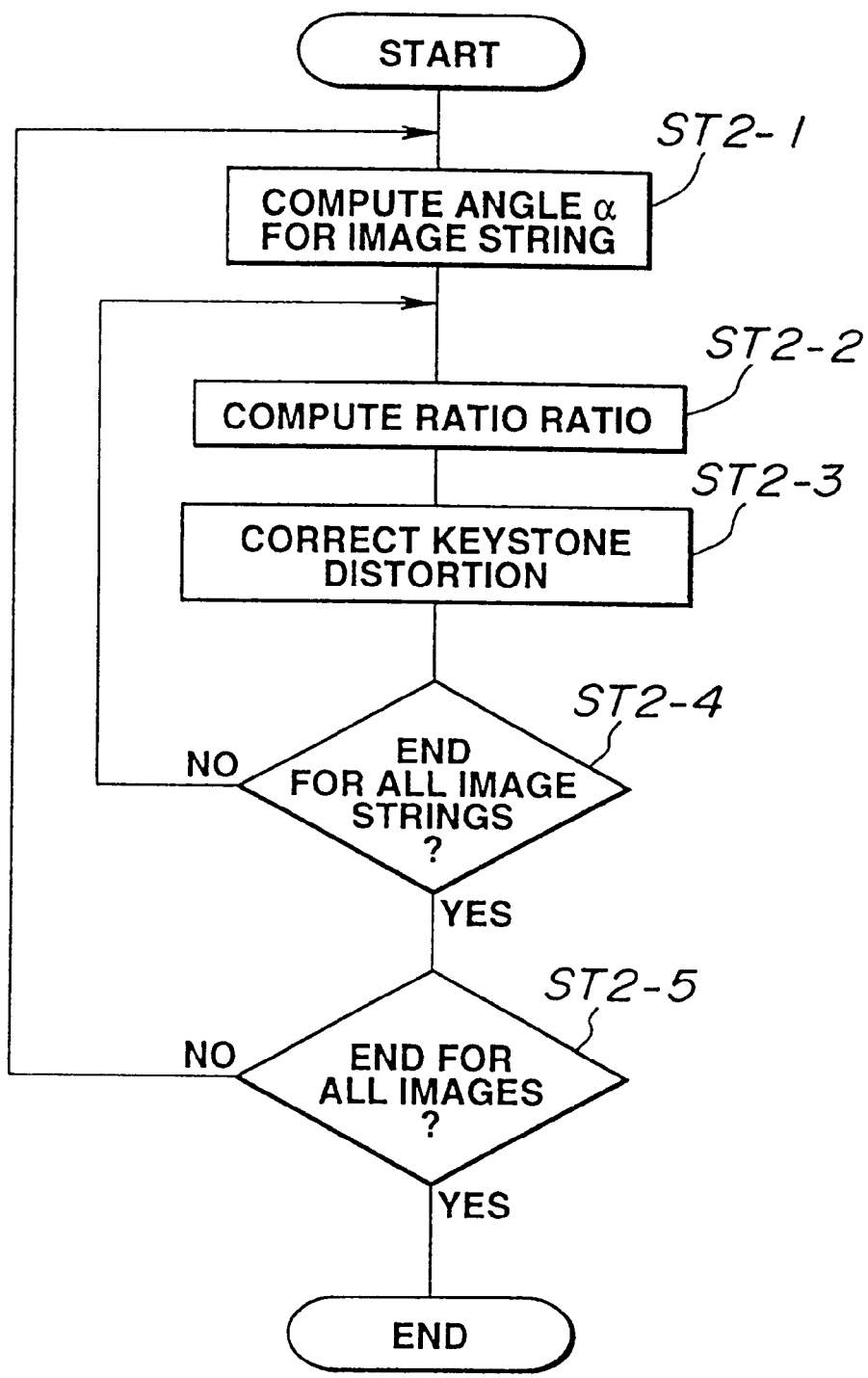
FIG. 15 is a flowchart showing processing for correcting the keystone distortion.

For correcting keystone distortions, the above angle α associated with each pixel string g, making up an image constituting an image to be corrected for keystone distortion, is calculated at step ST2-1 in FIG. 15.

Then, at step ST2-2, the above ratio associated with the pixel string g, based on the equation (2), is calculated.

Then, at step ST2-3, the image corresponding to the pixel string g is enlarged or diminished, based on the ratio as calculated at step ST2-2, for correcting the keystone distortion by the pixel string g.

At this time, the image data is coordinate-transformed so that the light-receiving surface of the imaging device 52 imaging the original images will be parallel to the light exposure surface of the recording medium for hologram 30, that is so that the original images as shot by the imaging device 52 will be parallel to an image recorded on the recording medium for recording 30.

In this coordinate transformation, a coordinate position x' of an original image as shot by the imaging device 52 and a coordinate position x of an image recorded on the recording medium for hologram 30 are set, and the angle α, represented by the equation (3):

$$\alpha = \tan^{-1}\left\{\frac{x}{dv \cdot (\sin\theta + \cos\theta) - x \cdot \tan\theta}\right\} \quad (3)$$

is calculated for plural points as sampled at an equal interval on an image recorded on the recording medium for recording 30.

From α as calculated by the equation (3), a coordinate position x' of the original image associated with the coordinate position x recorded on the recording medium for hologram 30 is calculated by the equation (4):

$$x' = dv \cdot \tan\alpha \quad (4)$$

From the above equations (3) and (4), the relation between the image position x' and the coordinate position x of an image recorded on the recording medium for hologram 30 is clarified. Thus, coordinate transformation is executed in accordance with the equations (3) and (4) and image data mapping is executed so that an image recorded on the recording medium for hologram 30 will be parallel to the recording medium for hologram 30. In actual calculations, the unit system of dv, x and x' is associated with each pixel of the image data.

Then, at step ST2-4, it is checked whether or not the keystone distortion has been corrected for all pixel strings g. If there is any pixel string g for which keystone distortion has not been corrected, processing reverts to step ST2-2 for correcting the keystone distortion of any pixel string for which keystone distortion has not been corrected.

If there is no pixel string g for which keystone distortion has not been corrected, such that correction of keystone distortion has been completed for all pixel strings g, processing reverts to step ST2-1 for correcting the keystone distortion for any image for which keystone distortion has not been corrected.

The above processing completes the correction of the keystone distortion of all images making up the parallax image string.

The above-described correction for keystone distortion may be performed at any timing prior to the viewing point conversion processing as later explained. That is, the correction of keystone distortion may be performed each time image data for one parallax image of the parallax image string is entered from the parallax image string imaging system to the image data processor 60 or after image data of all parallax images constituting the parallax image string have been entered from the parallax image string imaging system to the image data processor 60.

The viewing point conversion processing, performed on image data corrected for keystone distortion, is now explained.

Figure 16:
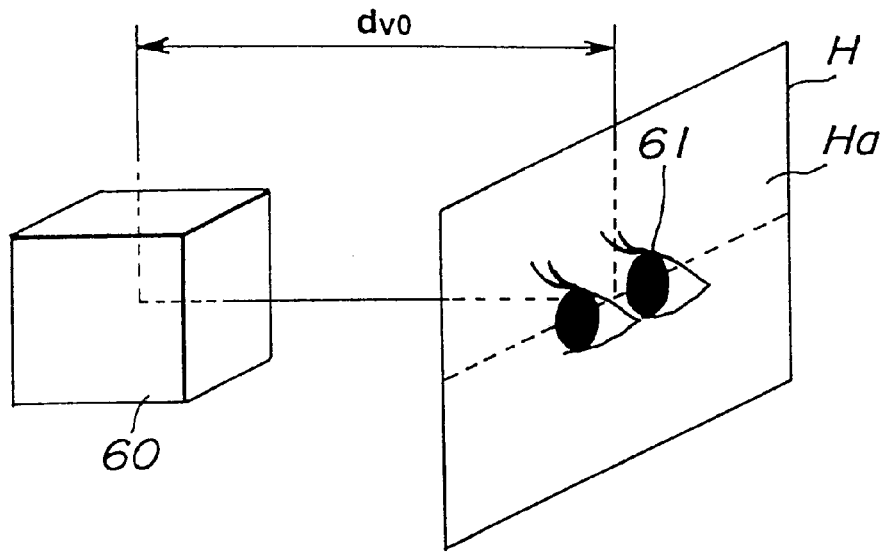
FIG. 16 is a schematic view showing the manner of observing an image reproduced from a holographic stereogram produced without performing viewing point conversion.

In a holographic stereogram, the positional relation between the viewing point of the imaging device 52 and the object 50 at the image shooting time is kept for the playback image of the produced holographic stereogram, so that, if the image data of the parallax image string as imaged are directly used for formulating the holographic stereogram, a reproduced image 60 is formed at a point deeper than a hologram plane Ha of a holographic stereogram H, as shown in FIG. 16. Thus, in such holographic stereogram H, there is produced distortion in the reproduced image 60 unless the reproduced image 60 is viewed with a viewing point 61 set on the hologram plane Ha at the viewing time so that the distance dv0 from the reproduced image 60 to the viewing point 61 coincides with the distance dv from the center of the object 50 at the image shooting time to the viewing point of the image imaging device 52.

On the other hand, in a white-colored playback holographic stereogram, reproduced with the white light, the further the image-forming position of the playback image 60 from the hologram plane Ha, the more the reproduced image 60 becomes blurred. Thus, if the reproduced image 60 is formed at a position deeper than the hologram plane Ha, the reproduced image 60 becomes blurred.

Figure 17:
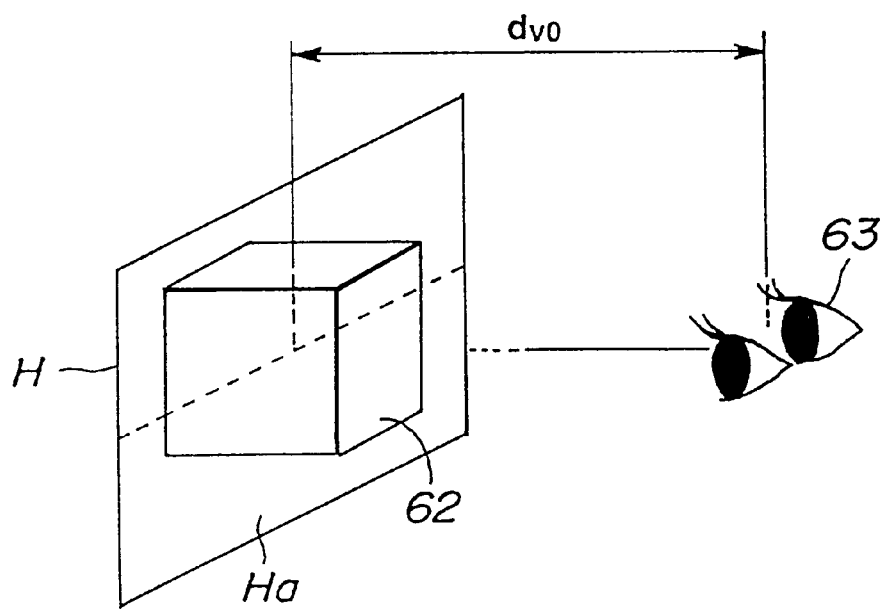
FIG. 17 is a schematic view showing the manner of observing an image reproduced from a holographic stereogram produced after performing viewing pont conversion.

For overcoming these difficulties, the original image data is processed with viewing point conversion processing so that the reproduced image 62 is formed in the vicinity of the hologram plane Ha of the holographic stereogram H, as shown in FIG. 17. This produces the reproduced image 60 free from distortion or blurring even if the viewing point 63 is placed at a position spaced apart from the hologram plane Ha.

In the viewing point conversion processing, image mapping is performed in the horizontal parallax direction, based on the relation between the image viewing point at the time of generation of the parallax image string and viewing point position at the time of light exposure of the hologram, for generating image data of an image configured for coping with the viewing point 63 spaced from the hologram plane Ha. That is, in the viewing point conversion processing, the pixel strings g, as data of image strips of image data of plural parallax images of the parallax image string in the vertical direction, are interchanged in the arraying sequence thereof for re-constructing new image data having converted viewing points.

Figure 18:
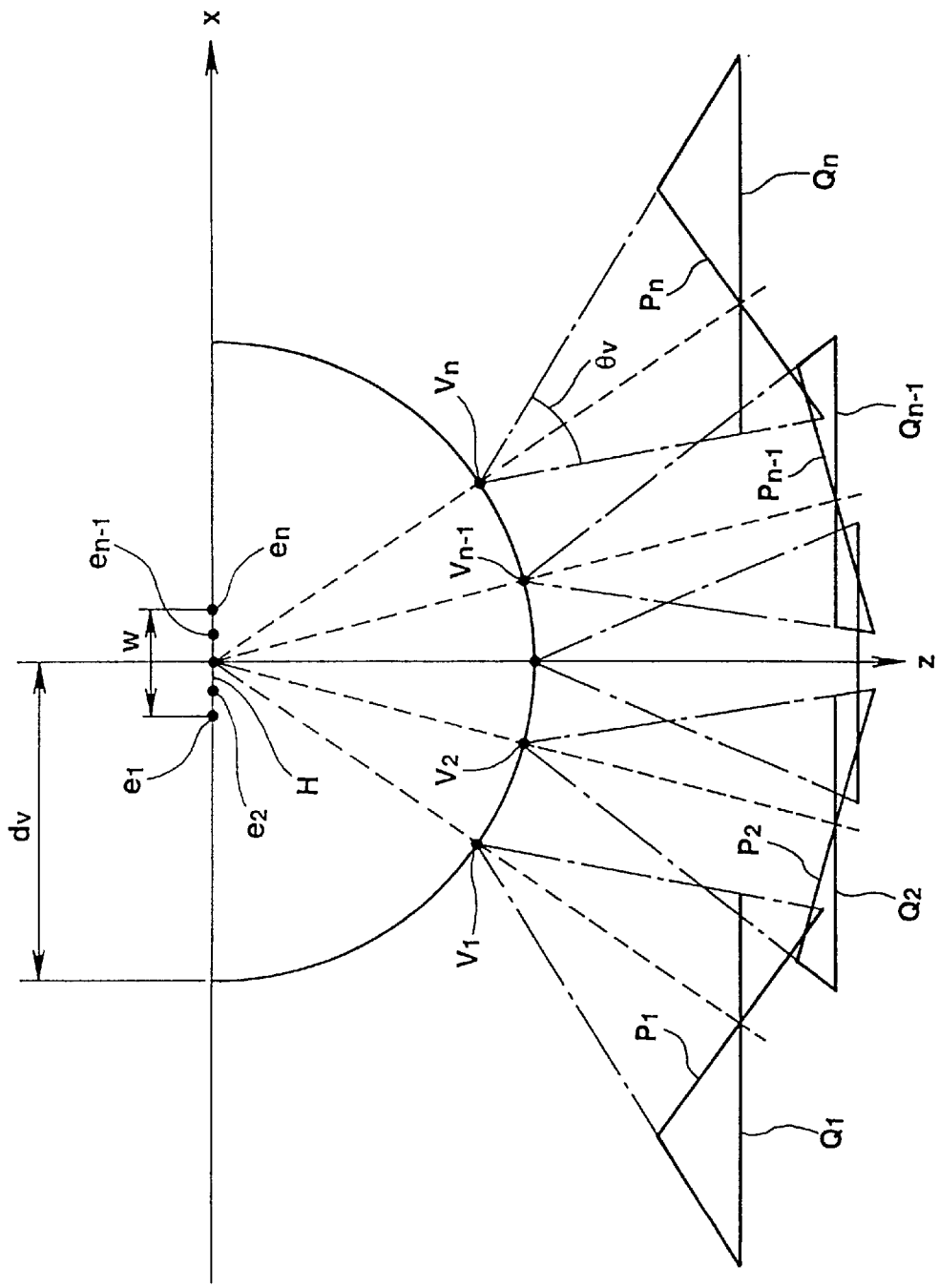
FIG. 18 shows the relation between the parallax image string based on which the viewing point conversion processing is performed and the position of the holographic stereogram.

Before proceeding to the detailed description of the viewing point conversion processing, a string of parallax images, on which the viewing point conversion processing is performed, is explained by referring to FIG. 18.

In this figure, H denotes a holographic stereogram, and e1, e2, . . . , en−1, 2n denote the positions of the light exposure of the elementary holograms. W denotes the length in the horizontal direction of the holographic stereogram H and dv denotes the distance between the center of the object 50 and the viewing point of the image imaging device 52. On the other hand, v1, v2, . . . , vn−1, vn denote the viewing point positions of the image imaging device 52 at the time of imaging the parallax image string and θv denotes the image angle at the imaging time. In addition, P1, P2, . . . , Pn−1, Pn denote parallax images of the parallax image string as imaged, and Q1, Q2, . . . , Qn−1, Qn denote the images corrected for keystone distortion.

Referring to FIG. 18, a parallax image string made up of images P1, P2, . . . , Pn−1, Pn is obtained by rotating the imaging device along the same curvature from the viewing point V1 to the viewing point Vn. These images P1, P2, . . . , Pn−1, Pn are corrected for keystone distortion as described above for producing images Q1, Q2, . . . , Qn−1, Qn corrected for keystone distortion. In the viewing point conversion processing, new viewing point converted image data are generated from the images Q1, Q2, . . . , Qn−1, Qn corrected for keystone distortion.

If the center of the holographic stereogram H is set as an origin, the horizontal direction parallel to the holographic stereogram H is the X-axis and the direction perpendicular to the holographic stereogram H and normal to the X-axis is the Z-axis, the coordinates (x1, z1) of the viewing point v1 and the coordinates (xn, zn) of the viewing point v1 are set as shown by the equation (5):

$$x1 = \frac{W \cdot \cot^2 \frac{\theta_v}{2} + \sqrt{(4d_v^2 - W^2) \cdot \cot^2 \frac{\theta_v}{2} + 4d_v^2}}{2\left(1 + \cot^2 \frac{\theta_v}{2}\right)} \tag{5}$$

$$z1 = \frac{-W + \sqrt{(4d_v^2 - W^2) \cdot \cot^2 \frac{\theta_v}{2} + 4d_v^2}}{2\left(1 + \cot^2 \frac{\theta_v}{2}\right)} \cdot \cot \frac{\theta_v}{2}$$

$$xn = -x1 \tag{6}$$
$$zn = z1$$

for generating a parallax image string required for viewing point conversion as later explained.

Referring to FIG. 18, the viewing points v1, v2, . . . , vn−1, vn of the images P1, P2, . . . , Pn−1, Pn, as shot by the imaging device 52, are moved on an arcuate path. The same holds for the images Q1, Q2, . . . , Qn−1, Qn corrected for keystone distortion. That is, the viewing points of these images Q1, Q2, . . . , Qn−1, Qn are also moved on an arcuate path. If the parallax image string, the viewing points for which are moved along an arcuate path, is directly recorded on a planar-shaped hologram recording medium, the reproduced image is distorted. Thus, when converting the viewing point positions for forming a reproduced image on the hologram surface, the viewing points are simultaneously converted so as to be moved parallel to the hologram plane.

Figure 19:
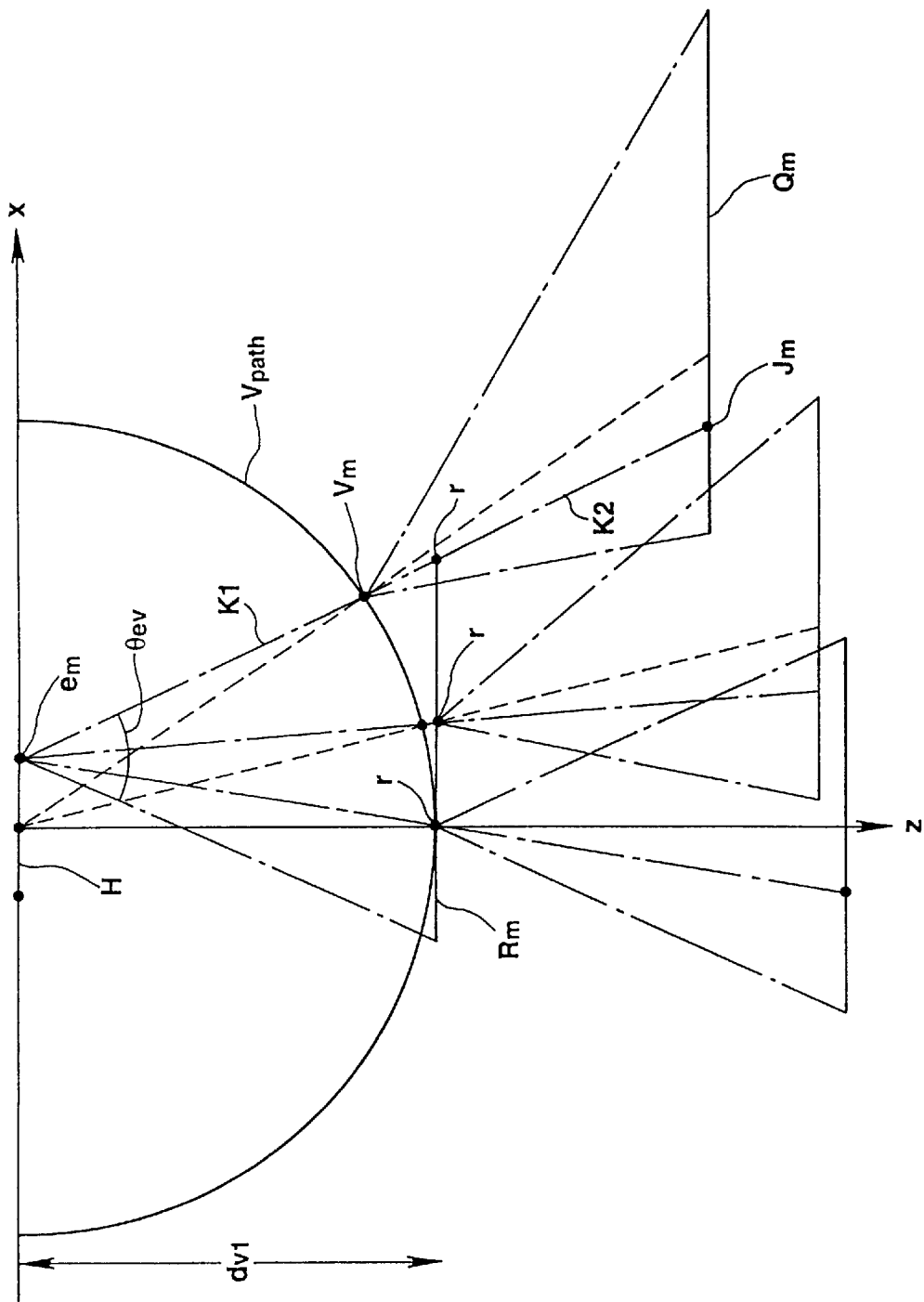
FIG. 19 illustrates the viewing point conversion processing.
Figure 20:
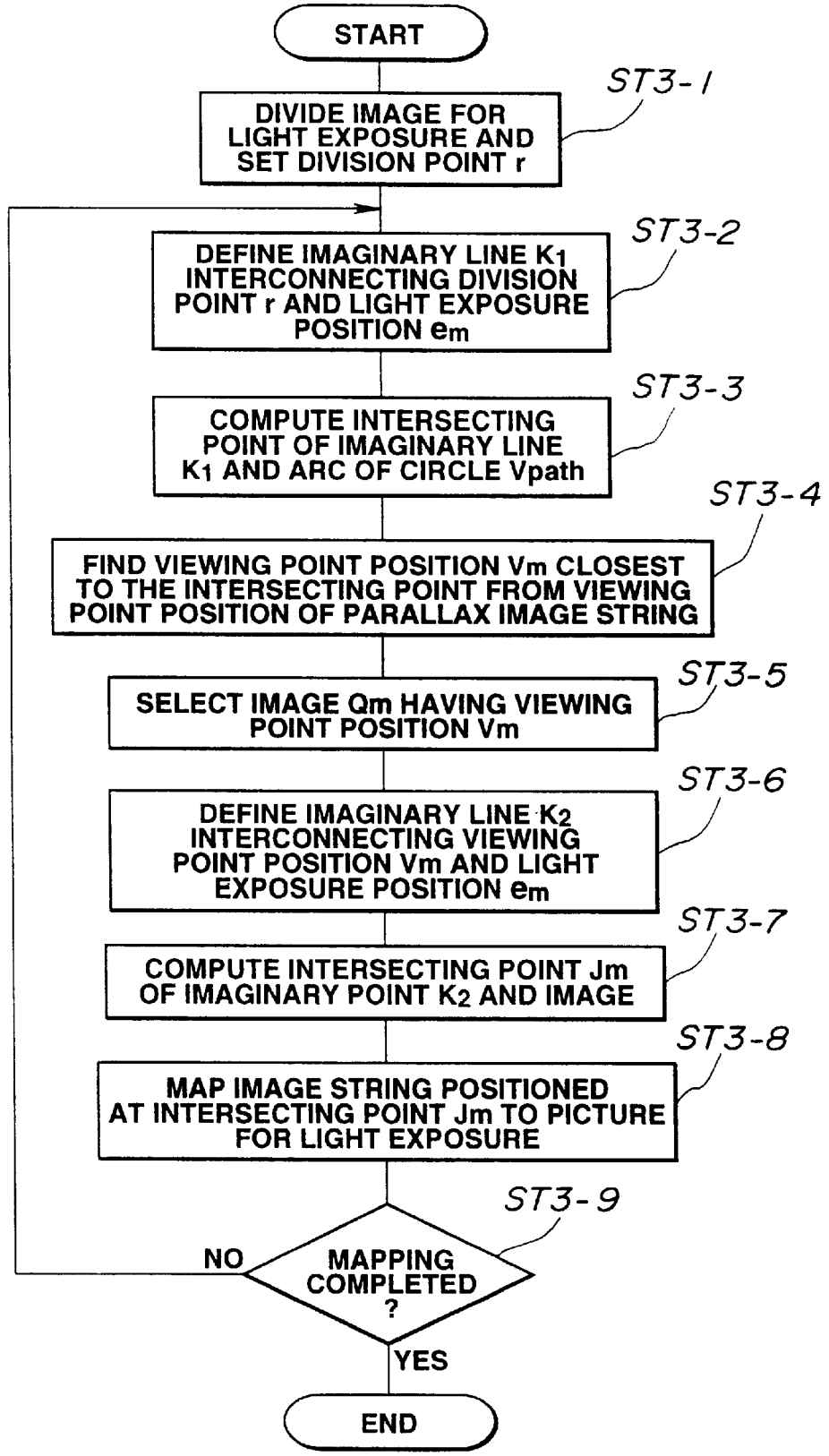
FIG. 20 is a flowchart for the viewing point conversion processing.

The viewing point conversion processing is hereinafter explained by referring to FIG. 19 showing the manner of viewing point conversion processing and to a flowchart of FIG. 20 showing the flow of viewing point conversion.

FIG. 19 shows the manner in which image data of a sole image for light exposure Rm associated with a light exposure position em of an elementary hologram is reconstructed from the original parallax image string. In effect, image data of images for light exposure R1, R2, . . . , Rn−1, Rn associated with the light exposure positions e1, e2, . . . , en−1, en of the elementary holograms, respectively, are reconstructed. Specifically, the number of elementary holograms is on the order of 500, which is equal to the number of re-constructed image data for light exposure. However, since the number of elementary holograms is determined by the size of the holographic stereogram formulated and the light exposure pitch of the elementary holograms, the number of the elementary holograms is naturally not limited to 500.

In the following description, it is assumed that each image is made up of 480 pixels in the horizontal direction and 640 pixels in the vertical direction. That is, in the present viewing point conversion processing, image data of a number of images corresponding to the number of the elementary holograms, each image having 480 pixels in the horizontal direction and 640 pixels in the vertical direction, are generated from the images Q1, Q2, . . . , Qn−1, Qn corrected for keystone distortion.

For viewing point conversion, an image for light exposure R is divided at step ST3-1 in FIG. 20 every pixel column in association with the resolution in the horizontal direction and division points rm associated with the pixel columns are set. Since the image for light exposure Rm has 480 pixels in the horizontal direction, the image for light exposure is divided into 480 pixel columns in the shape of a Japanese reed screen and 480 division points r associated with the columns of pixels are set. At this time, each pixel column has one pixel in the horizontal direction and 640 pixels in the vertical direction.

At the next step ST3-2, one of the division points r as set at step ST3-1 is selected and an imaginary line k1 interconnecting the division point r and the light exposure position em of the elementary hologram is defined. At this time, the distance dv1 between the image for light exposure Rm and the holographic stereogram H is set so as to be coincident with the radius of an arc Vpath along which the viewing point of the original parallax image string is moved, while the image angle θev of the image for light exposure is set so as to be coincident with the image angle θs of the cylindrical lens 42 adapted for converging the object light on the recording medium for hologram 30 shown in FIGS. 5A and 5B.

Then, at step ST3-3, a point of intersection of the imaginary line kl defined at step ST3-2 with the arc Vpath along which is moved the viewing point of the original parallax image string, is calculated.

Then, at step ST3-4, a viewing point vm, which is closest to the point of intersection as found at step ST3-3, is found from the viewing points of the image corrected for keystone distortion.

Then, at step ST3-5, an image Qm, having the viewing point Vm as found at step ST3-4, is found from viewing points of the image corrected for keystone distortion.

Then, at step ST3-6, an imaginary line k2 interconnecting the viewing point vm as found at step ST3-4 and the light exposure point em of the elementary hologram is defined.

At step ST3-7, a point of intersection jm between the imaginary line k2 as defined at step ST3-6 and the image Qm selected at step ST3-5 is calculated.

Then, at step ST3-8, a pixel column positioned at the point of intersection jm as found at step ST3-7 is selected from the pixel strings making up the image Qm as selected at step ST3-5 is selected and the selected pixel column is mapped to the pixel column associated with the division point r of the image for light exposure Rm.

That is, of the pixel columns corrected for keystone distortion, the column pixel positioned at the point of intersection indicated by ■ in FIG. 19 is mapped to a position indicated by ● of the image for light exposure Rm in FIG. 19.

At step ST3-9, it is checked whether or not mapping of the pixel columns has been completed for all of the division points r. If mapping has not been completed for all division points r, processing reverts to step ST3-2 for performing mapping of the image string for any division points for which the mapping has not been completed.

By the above processing, viewing point conversion is completed for the sole image for light exposure Rm and image data for one image for light exposure Rm is constructed and generated.

The above-described viewing point conversion processing is repeated in association with the light exposure positions e1, e2, . . . , en−1, en of the elementary holograms and image data of a number of the images for light exposure R1, R2, . . . , Rn−1, Rn equal to the number of the elementary holograms are re-constructed. This converts the viewing points for causing a playback image to be formed on the hologram surface, while generating image data of the parallax image string the viewing points of which are adapted for being moved parallel to the hologram surface.

Meanwhile, the viewing point conversion processing is realized by interchanging the pixel columns for generating new image data. The interchanging sequence is the same even for different strings of parallax images, if the parameters for viewing point conversion processing remain the same. Therefore, if, in the viewing point conversion processing, the viewing points or the like of the original string of parallax images remain the same, there is no necessity of repeating the above-mentioned calculations, but it suffices if data recording the interchanging sequence of the pixel strings is laid in store and the pixel columns are interchanged by having reference to the data thus laid in store.

Specifically, the viewing point conversion processing is performed only for the first time in accordance with the flowchart shown in FIG. 20, and the relation of correspondence between the original string of parallax images and the pixel columns of the images for light exposure is found. This relation of correspondence is stored in an external memory device, such as a hard disc, and the second and following viewing point conversion processing operations are performed on the basis of the relation of correspondence thus stored. This eliminates repetition of arithmetic processing operations for significantly improving the processing speed.

By performing the correction for keystone distortion and viewing point conversion processing for re-constructing image data of the string of parallax images and by formulating the holographic stereogram using the re-constructed image data, it becomes possible to produce a planar holographic stereogram in which reproduced images are formed without distortion on the hologram surface.

In the holographic stereogram, produced on the basis of the image data, the viewing point information is corrected by the keystone distortion correction and the viewing point conversion as concerns the parallax in the horizontal direction. On the other hand, the information at the time of imaging the parallax image is kept unchanged as concerns the parallax in the vertical direction. Thus, with the holographic stereogram, produced on the basis of the image data, a playback image reproduced in the vicinity of the hologram surface without distortion can be observed by moving the viewing point along an arcuate path as in the case of moving the imaging device at the time of imaging.

What is claimed is:

1. An image data generating method comprising:
   obtaining image data by rotating an object or an image device, with the distance between the object and the imaging device being kept substantially constant, for shooting plural images of different viewing points by said imaging device;
   correcting image data of a plurality of images as shot for keystone distortion such that a keystone effect is removed before recording on a holographic stereogram; and
   processing the image data corrected for keystone distortion with viewing point conversion processing for generating image data of an image for recording on said holographic stereogram.

2. The image data generating method as claimed in claim 1 wherein, when imaging an object, the object is placed on a rotary table, which rotary table is rotated a pre-set angle each time the object is imaged for producing plural images with different viewing points.

3. The image data generating method as claimed in claim 1 wherein, when imaging an object, the imaging device is rotated a pre-set angle each time the object is imaged for producing plural images with different viewing points.

4. The image data generating method as claimed in claim 1 wherein, at the time of viewing point conversion processing, pixels making up an image corrected for keystone distortion are interchanged every pixel string; and wherein image data of an image for recording on a holographic stereogram are recorded on a holographic stereogram so that a reproduced image will be formed in the vicinity of a hologram surface of the holographic stereogram.

5. The image data generating method as claimed in claim 1 further comprising:

compressing obtained image data including the information of plural images and storing the compressed data in an internal memory device of a computer; and expanding, after storage of image data in an internal memory device, only image data of an image required for image data conversion of generating image data of an image recorded on said holographic stereogram.

* * * * *